United States Patent
Lin et al.

(10) Patent No.: US 6,668,115 B2
(45) Date of Patent: Dec. 23, 2003

(54) METHOD, APPARATUS, AND SYSTEM FOR COMPENSATION OF AMPLIFIER GAIN SLOPE AND CHROMATIC DISPERSION UTILIZING A VIRTUALLY IMAGED PHASED ARRAY

(75) Inventors: Christopher Lin, Berkeley, CA (US); Simon Cao, Fremont, CA (US)

(73) Assignee: Avanex Corporation, Fremont, CA (US)

( * ) Notice: Subject to any disclaimer, the term of this patent is extended or adjusted under 35 U.S.C. 154(b) by 223 days.

(21) Appl. No.: 09/746,708

(22) Filed: Dec. 22, 2000

(65) Prior Publication Data

US 2003/0215182 A1 Nov. 20, 2003

(51) Int. Cl.$^7$ .................................................. G02B 6/34
(52) U.S. Cl. ............................. 385/37; 385/31; 385/33
(58) Field of Search ............................. 385/31, 34, 37, 385/24, 140, 33; 359/124, 130, 131; 398/79, 81, 87

(56) References Cited

U.S. PATENT DOCUMENTS

| | | | |
|---|---|---|---|
| 5,805,759 A | * 9/1998 | Fukushima | 385/140 |
| 5,838,849 A | * 11/1998 | Shirasaki | 385/31 |
| 5,930,045 A | 7/1999 | Shirasaki | 359/577 |
| 5,969,865 A | * 10/1999 | Shirasaki | 359/577 |
| 6,028,706 A | 2/2000 | Shirasaki | 359/577 |
| 6,137,604 A | * 10/2000 | Bergano | 359/124 |
| 6,275,630 B1 | * 8/2001 | Yang et al. | 385/37 |
| 6,441,959 B1 | * 8/2002 | Yang et al. | 359/495 |
| 6,556,320 B1 | * 4/2003 | Cao | 359/122 |

* cited by examiner

Primary Examiner—Edward J. Glick
Assistant Examiner—Therese Barber
(74) Attorney, Agent, or Firm—Sawyer Law Group LLP

(57) ABSTRACT

The present invention provides an improved gain slope equalizer which provides variable optical attenuation. The gain slope equalizer includes a transmission diffraction grating with a first side and a second side; a first lens optically coupled to the second side of the transmission diffraction grating; and at least one reflective surface optically coupled to the first lens at a side opposite to the transmission diffraction grating. The gain slope equalizer in accordance with the present invention can also be used with a Virtually Imaged Phased Array (VIPA) to provide a chromatic dispersion slope and chromatic dispersion compensation as well as variable optical attenuation. The present invention provides the heretofore unavailable capability of simultaneous tunable gain slope equalization and chromatic dispersion compensation utilizing a single apparatus.

10 Claims, 28 Drawing Sheets

METHOD, APPARATUS, AND SYSTEM FOR COMPENSATION OF AMPLIFIER GAIN SLOPE AND CHROMATIC DISPERSION UTILIZING A VIRTUALLY IMAGED PHASED ARRAY

FIELD OF THE INVENTION

The present invention relates to wavelength division multiplexed (WDM) optical communications systems, and more particularly to optical attenuation across a plurality of optical channels and/or compensation for chromatic dispersion and chromatic dispersion slope in WDM optical communication systems.

BACKGROUND OF THE INVENTION

Wavelength division multiplexing (WDM) is a method by which a plurality of signal-carrying lights, each such light comprising a specific, restricted wavelength range, are carried along an optical fiber communications system. In this specification, these individual information-carrying lights are referred to as either "signals" or "channels." The totality of multiple combined signals in a wavelength-division multiplexed optical fiber, optical line or optical system, wherein each signal is of a different wavelength range, is herein referred to as a "composite optical signal."

The term "wavelength" is used synonymously with the terms "signal" or "channel." Although each information-carrying channel actually comprises light of a certain restricted range of physical wavelengths, for simplicity, a single channel is referred to as a single wavelength and a plurality of such channels are referred to as "wavelengths". Used in this sense, the term "wavelength" may be understood to refer to "the channel nominally comprised of light of a range of physical wavelengths centered at a particular nominal wavelength."

Fiber optic networks are becoming increasingly popular for data transmission because of their high speed and high capacity capabilities. Wavelength division multiplexing (WDM) is used in such fiber optic communication systems to transfer a relatively large amount of data at a high speed.

Because optical signals lose intensity upon transmission over long distances through optical fiber, optical amplifiers are commonly employed within optical communications systems to boost the signal intensity. The most common example of an optical amplifier is the Erbium Doped Fiber Amplifier (EDFA), for which an exemplary gain spectrum 10 is illustrated in FIG. 1. FIG. 1 shows that, although an EDFA can increase the signal intensity significantly, the gain that it produces is not uniform over the entire optical transmission region. This non-uniform gain does not pose a problem for single-channel (-wavelength) optical communications systems. However, for multi-channel (wavelength division multiplexed) systems, the non-uniform gain leads to a well-known problem of non-uniform amplification of the various channels. For instance, if the wavelengths $\lambda_{107}$ and $\lambda_{108}$ are used to represent two such channels amplified by a single EDFA, then it can be seen from FIG. 1 that the longer wavelength channel $\lambda_{107}$ receives a lesser amount of amplification or gain than does the shorter wavelength channel $\lambda_{108}$. After being output from the EDFA, the two channels $\lambda_{107}$ and $\lambda_{108}$ will exhibit non-equivalent intensities, which is an unacceptable result. Additional wavelength division multiplexed channels between $\lambda_{107}$ and $\lambda_{108}$ will exhibit a non-constant intensity distribution approximately described by the dashed line 11 in FIG. 1.

An even greater problem with the use of EDFA's is the fact that the exact form of the gain spectrum 100 is not static but can vary depending upon the amount of optical power that is input to an EDFA. This is most evident as a change in the gain tilt, which is the slope of the line 11 representing an average variation of the gain between the wavelengths $\lambda_{107}$ and $\lambda_{108}$. With changing gain tilt, the difference in amplification between channels is not constant.

A second common and well-known problem in the transmission of optical signals is chromatic dispersion of the optical signal. Chromatic dispersion refers to the effect wherein the individual wavelengths comprising an optical channel travel through an optic fiber at different speeds. This is a particular problem that becomes more acute for data transmission speeds higher than 2.5 gigabytes per second. The resulting pulses of the signal will be stretched, will possibly overlap, and will cause increased difficulty for optical receivers to distinguish where one pulse begins and another ends. This effect seriously compromises the integrity of the signal. Therefore, for a fiber optic communication system to provide a high transmission capacity, the system must compensate for chromatic dispersion. The exact value of the chromatic dispersion produced in a channel of a wavelength-division multiplexed fiber optic communications system depends upon several factors, including the type of fiber and the wavelength of the channel. Chromatic dispersion slope is the variation of the chromatic dispersion amongst the various channels comprising a WDM composite optical signal.

Conventional apparatuses that can be used as dispersion compensating components include dispersion compensation fiber, chirped fiber Bragg gratings coupled to optical circulators, and conventional diffraction gratings disposed as sequential pairs. Unfortunately, these conventional apparatuses do not compensate for unequal channel intensities produced by EDFA gain tilt.

Accordingly, there is a need for an improved gain slope equalizer. The gain slope equalizer should provide variable optical attenuation of a composite optical signal so as to equalize the intensities of a plurality of WDM channels so as to compensate for gain slope. It should be able to be used in an apparatus which provides non-uniform chromatic dispersion so as to compensate for fiber-induced chromatic dispersion and dispersion slope. The present invention addresses such a need.

SUMMARY OF THE INVENTION

The present invention provides an improved gain slope equalizer which provides variable optical attenuation. The gain slope equalizer includes a transmission diffraction grating with a first side and a second side; a first lens optically coupled to the second side of the transmission diffraction grating; and at least one reflective surface optically coupled to the first lens at a side opposite to the transmission diffraction grating. The gain slope equalizer in accordance with the present invention can also be used with a Virtually Imaged Phased Array (VIPA) to provide a chromatic dispersion slope and chromatic dispersion compensation as well as variable optical attenuation. The present invention provides the heretofore unavailable capability of simultaneous tunable gain slope equalization and chromatic dispersion compensation utilizing a single apparatus.

DETAILED DESCRIPTION

The present invention provides an improved gain slope equalizer which provides variable optical attenuation. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

To more particularly describe the features of the present invention, please refer to FIGS. 2a through 16b in conjunction with the discussion below.

Figure 1:
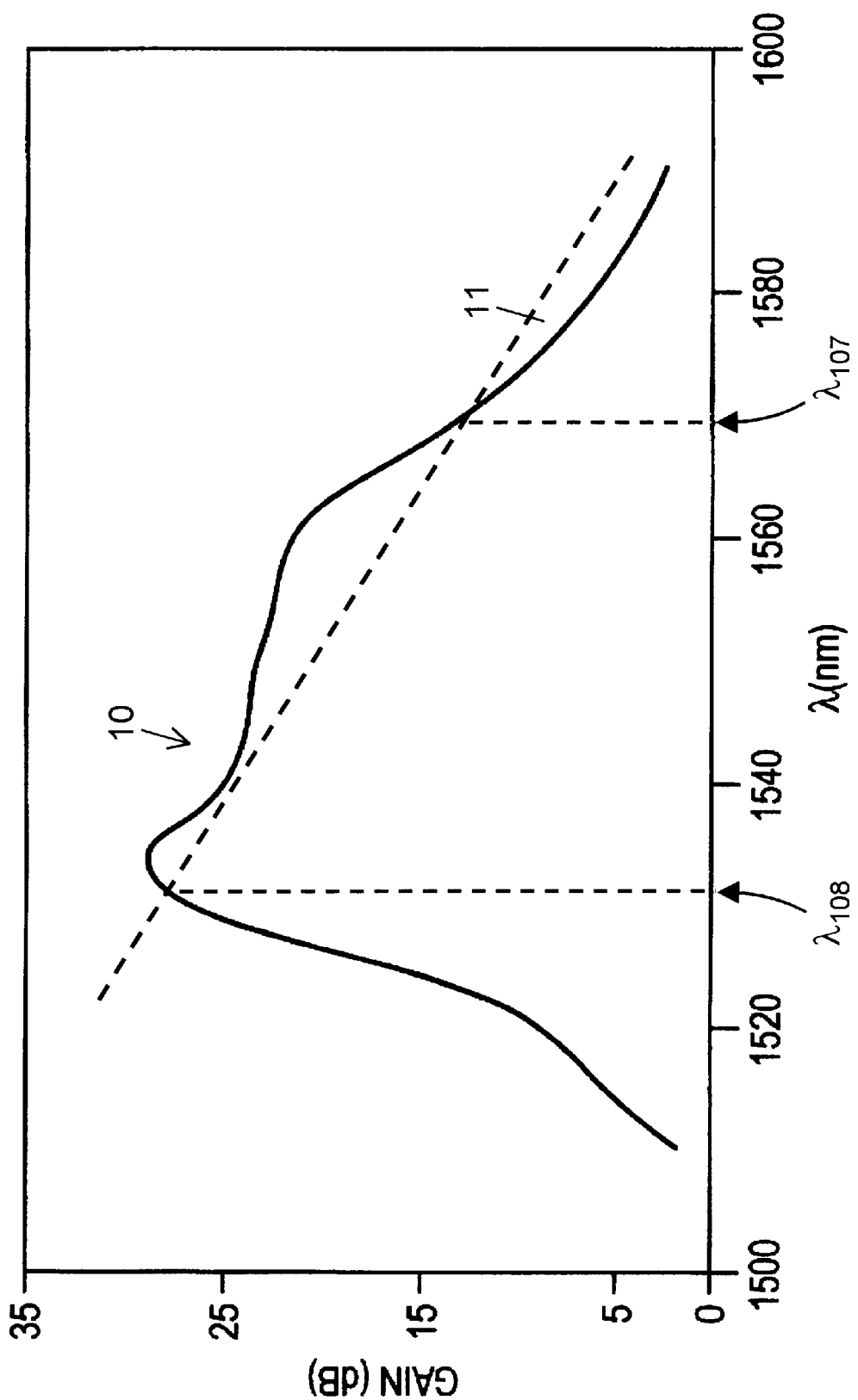
FIG. 1 is a diagram illustrating a typical gain spectrum of an Erbium-Doped Fiber Amplifier (EDFA).
Figure 2A:
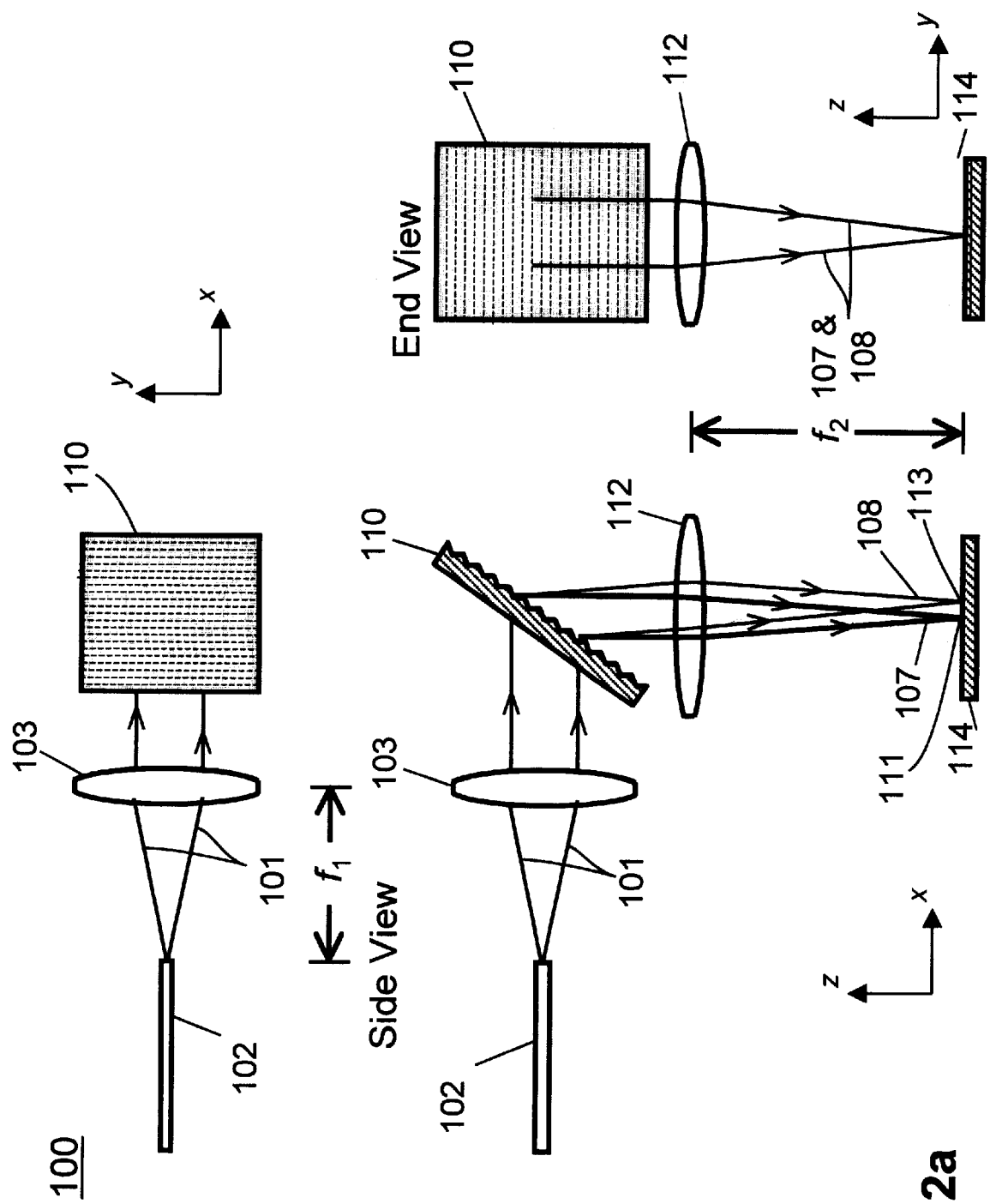
FIGS. 2a–2c each illustrate a top view and a side view of a first preferred embodiment of a gain slope equalizer in accordance with the present invention.
Figure 2B:
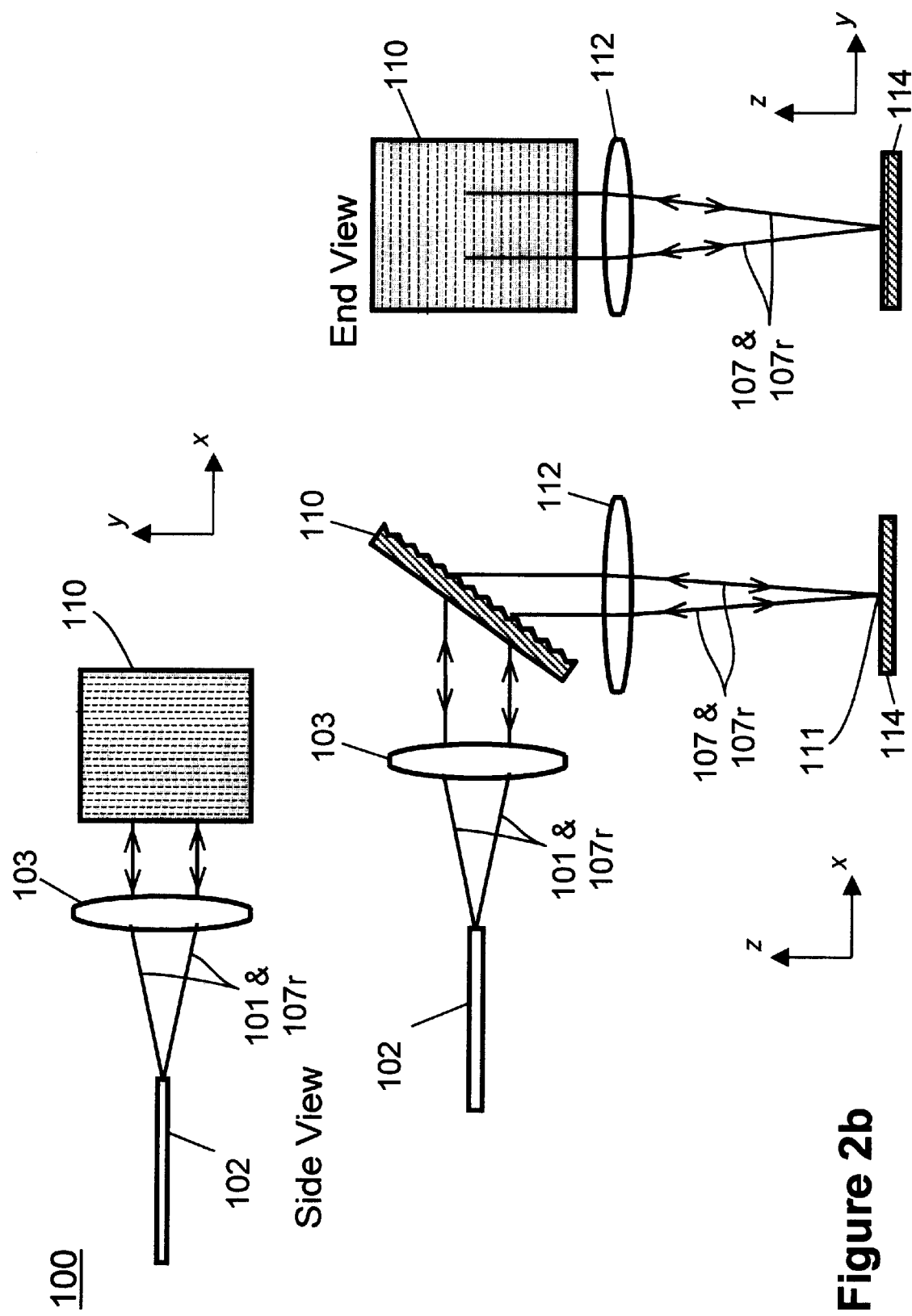
Figure 2C:
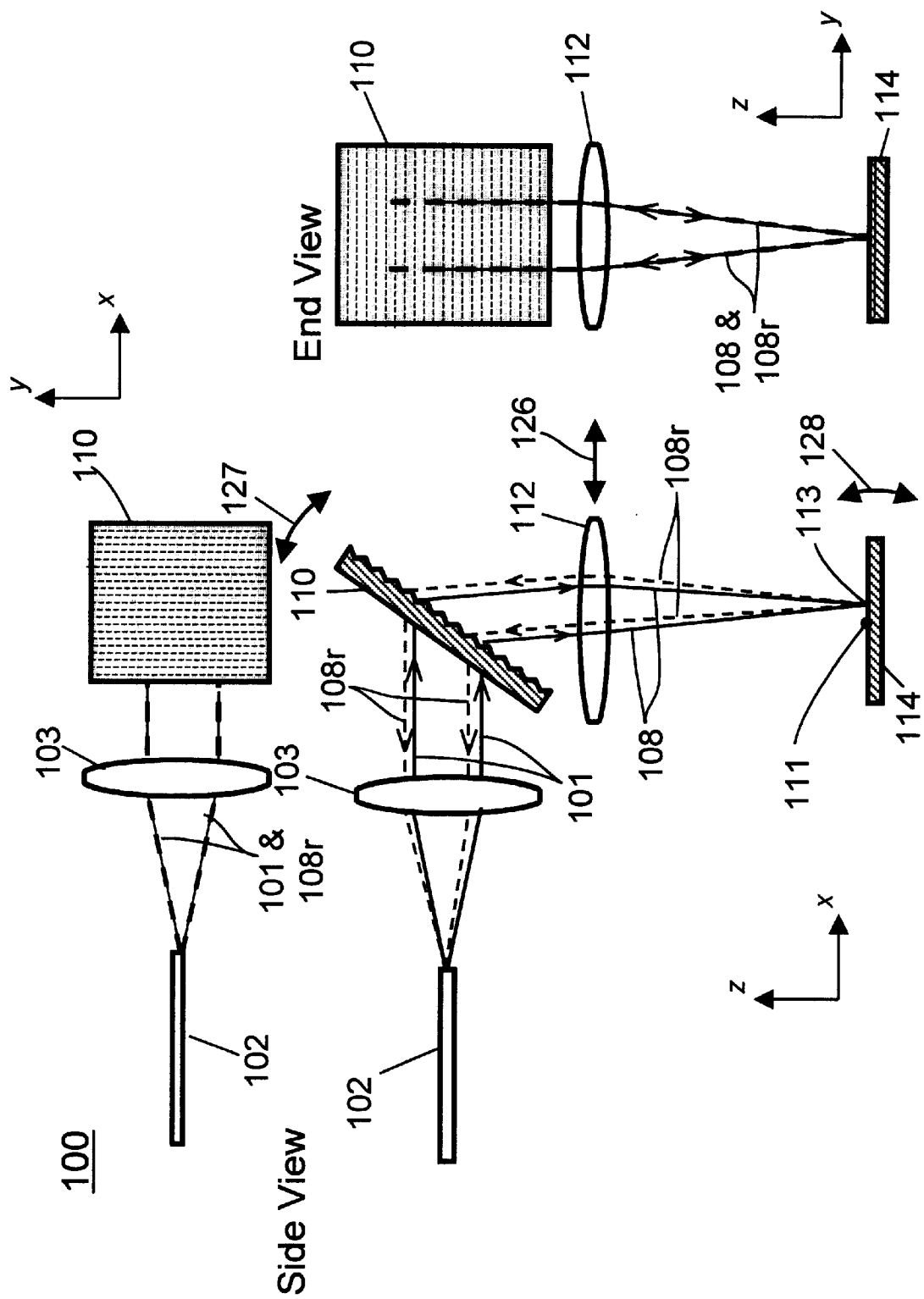

FIGS. 2a–2c each illustrate a top view, a side view, and an end view of a first preferred embodiment of a gain slope equalizer in accordance with the present invention. For ease of visualization, the directions of the axes of a Cartesian coordinate system are included in FIGS. 2a–2c and subsequent figures. However, it is to be kept in mind that the inclusion of these x, y and z-axes in a drawing do not imply any particular orientation of the illustrated equalizer 100 or any particular angular relationship among the various parts or ray paths within the equalizer 100. The gain slope equalizer 100 (FIGS. 2a–2c) comprises an input and output fiber 102, a collimating lens 103 optically coupled to the input and output fiber 102, a transmission diffraction grating 110 optically coupled to the collimating lens 103, a focusing lens 112 optically coupled to the transmission diffraction grating at a side opposite to the collimating lens and a reflecting surface 114 optically coupled to the focusing lens 112 at a side opposite to the transmission diffraction grating as shown in FIGS. 2a–2c. The gain slope equalizer 100 comprises an adjustable variable optical attenuator whose attenuation varies continuously with wavelength such that shorter wavelengths are attenuated to a greater degree than are longer wavelengths. This wavelength variation of optical attenuation counteracts the average decrease in gain with increasing wavelength given by line 11 in FIG. 1.

In operation of the gain slope equalizer 100, a diverging light 101 comprising a WDM composite optical signal is delivered from the input and output fiber 102 and is collimated by the collimating lens 103. The light 101 comprises a plurality of separate channels as defined above. Only the paths of a first channel 107 and a second channel 108 are illustrated in FIGS. 2a–2b, however. These channels correspond to the relatively longer wavelength $\lambda_{107}$ and the relatively shorter wavelength $\lambda_{108}$, respectively, as defined in FIG. 1. After passing through the lens 103, the light 101 passes through the transmission diffraction grating 110 wherein the channels are spatially dispersed according to their respective wavelengths. The transmission grating preferably comprises a volume holographic grating, whose manufacture and operation is well known in the art.

After emerging from the transmission diffraction grating 110, the light comprising each of the channels 107–108 remains collimated, although the directions of the collimated lights 107–108 are separated from one another according to the well known wavelength dispersion properties of gratings. These separated collimated channels 107–108 then each pass through the focusing lens 112. Since the reflective surface 114 is disposed at a distance from the lens 112 substantially equivalent to the focal length $f_2$ of lens 112, the focusing lens causes each of the channels 107–108 to come to a focus at the reflective surface 114. The focal point of channel 107 comprising the longest wavelength $\lambda_{107}$ to be attenuated by the gain slope equalizer 100 coincides with or is nearly coincident with the focus 111 of the focusing lens 112. The other channel 108 focuses at the point 113 that is on the reflective surface 114 but that is offset to a much greater degree from the lens focus 111 than is the focal point of channel 107. Other channels comprising intermediate wavelengths (not shown) are focused at respective points between the focal point 111 and the focal point 113.

After being focused upon the reflective surface 114, the light rays comprising the channels 107–108 are reflected so as to return through the focusing lens 112, the transmission diffraction grating 110, and the collimating lens 103, in this order, so as to be returned to the input and output fiber 102. In the gain slope equalizer 100, the same fiber 102 is utilized for both input and output. This use of a single fiber may necessitate separation of the input and output signals by a separate apparatus, as described further below. Because the channels 107–108 impinge upon reflective surface 114 at respective different angular ranges as a result of the spatial dispersion by the transmission diffraction grating 110, the reflected portions of the lights comprising the two channels 107–108 are likewise reflected along differing respective angular ranges. Because the focal point of the longer wavelength channel 107 substantially coincides with the focus 111 of lens 112, the pathway of the returning reflected portion 107r of this light exactly coincides with the forward pathway of the light of channel 107, as shown in FIG. 2b. However, because the focal point 113 of the shorter wavelength channel 108 is offset from the lens focus 111, then the pathway of the returning reflected portion 108r of this light does not coincide with the forward pathway of the light of channel 108, as shown in FIG. 2c.

The light of each of the returning reflected channels 107r–108r diverges from its focal point 111 or 113, respectively, and passes through the focusing lens whereupon it becomes re-collimated. These return pathways of the reflected channels are illustrated in FIG. 2b and FIG. 2c for channel 107r and 108r, respectively. After collimation by the lens 112, the path of the returning reflected channel 107r exactly coincides with that of the forward propagating channel 107, although in the opposite direction (FIG. 2b). Also, after collimation by lens 112, the path of the returning reflected channel 108r is parallel to but only partially overlaps the path of the forward propagating channel 108 (FIG. 2c).

Figure 8:
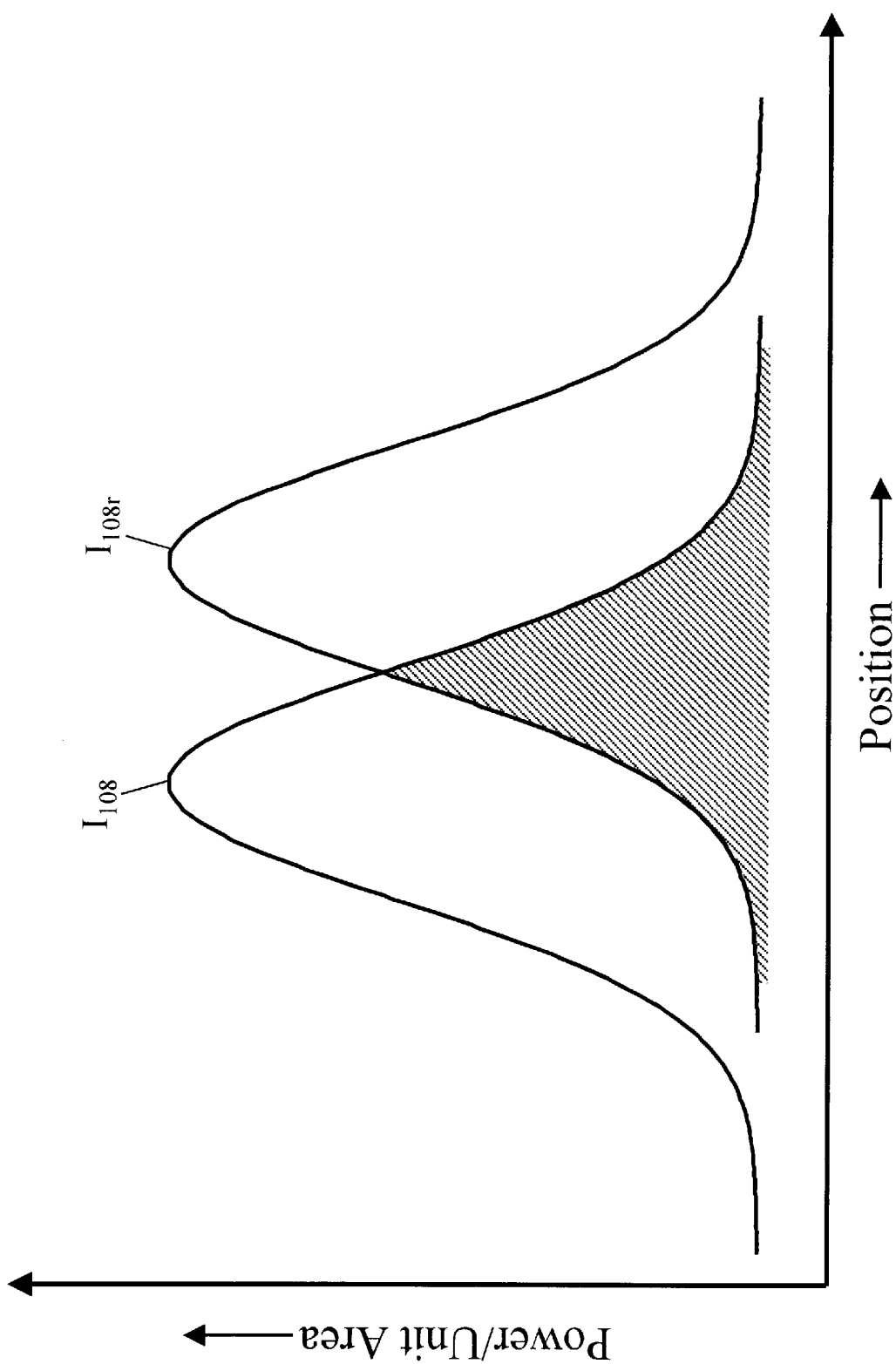
FIG. 8 is a graph of the spatial intensity distribution of forward and reverse propagating light through the gain slope equalizer embodiments in accordance with the present invention.

An exemplary representation of this partial overlap is illustrated in FIG. 8. In FIG. 8, the abscissa represents position along a line approximately at right angles to the propagation direction of channels 108 and 108r through the centers of the lights of the two channels and the ordinate represents the luminous power per unit area carried by either of the two channels at any point along said line. In FIG. 8, the luminous power per unit area of the forward propagating channel 108 is represented by curve $I_{108}$ and that of the returning reflected channel 108r is represented by curve $I_{108r}$. Each of these curves is approximately Gaussian in shape and the shaded area in FIG. 8 represents their region of mutual overlap. The area encompassed by both solid boundary lines of channel 108 as well as by both dashed boundary lines of returning reflected channel 108r gives this same region of mutual overlap in FIG. 2c. Note that, as shown in FIG. 2b, there is essentially 100% overlap between channels 107 and 107r.

The returning collimated reflected channels 107r and 108r pass through back through the transmission diffraction grating 110. Because the paths of the returning reflected channel 107r and of the returning reflected channel 108r are anti-parallel to those of the channel 107 and 108, respectively, the transmission diffraction grating 110 sets the directions of both of these returning reflected channels back anti-parallel to the direction of the composite optical signal 101. This anti-parallelism occurs because of the well-known principle of reversibility of grating 110 and because channel 107r (108r) is of the same wavelength and is anti-parallel to channel 107 (108). After passing through the grating 110 in the return direction, the spatial region of channel 107r exactly coincides with that of composite optical signal 101 (FIG. 2b). However, because of the offset or incomplete overlap between the spatial distributions of channels 108 and 108r (FIG. 8), the path of channel 108r is offset from that of composite optical signal 101 (FIG. 2c).

After passing through the transmission diffraction grating 110, the returning reflected channels pass through and are focused by the lens 103 onto the end face of the fiber 102. Because the spatial power distribution of channel 107r exactly coincides with that of forward propagating composite optical signal 101, the channel 107r is returned to the fiber 102 without attenuation. However, since the spatial power distribution of channel 108r does not exactly overlap with that of composite optical signal 101 (e.g., FIG. 8), the channel 108r is focused onto the end face of fiber 102 with an angular distribution that is different from that of the diverging composite optical signal 101 as it leaves fiber 102. Only the portions of the light 108r that are within the divergence cone of composite optical signal 101 may return to the fiber 102 because this cone is equivalent to the angular acceptance cone of fiber 102. These portions comprise the portions of channel 108r that are within the overlap region shown as the shaded area in FIG. 8. Other portions of light 108r outside of this cone are not input to fiber 102 and are thus attenuated. These other portions comprise the portions of channel 108r that are outside of the overlap region. The degree of attenuation may thus be calculated and is related to the area of the shaded region in FIG. 8.

The above description and FIGS. 2a–2c demonstrate the fashion by which the gain slope equalizer 100 performs as a variable optical attenuator that can compensate for the non-constant gain of an EDFA (FIG. 1). Because the degree of attenuation and its variation with wavelength depends on the trajectories of the ray paths of the various channels upon reflection at the reflective surface 114, any mechanical adjustment that affects these trajectories, either directly or indirectly, can be utilized to control the magnitude and wavelength variation of the attenuation. Three such mechanical adjustments are illustrated for the gain slope equalizer 100 in FIG. 2c. These mechanical adjustments comprise change of the angle of the transmission diffraction grating 110 according to adjustment 127, lateral movement of the focusing lens 112 according to adjustment direction 126 and rotation of the reflective surface according to adjustment direction 128.

Figure 3A:
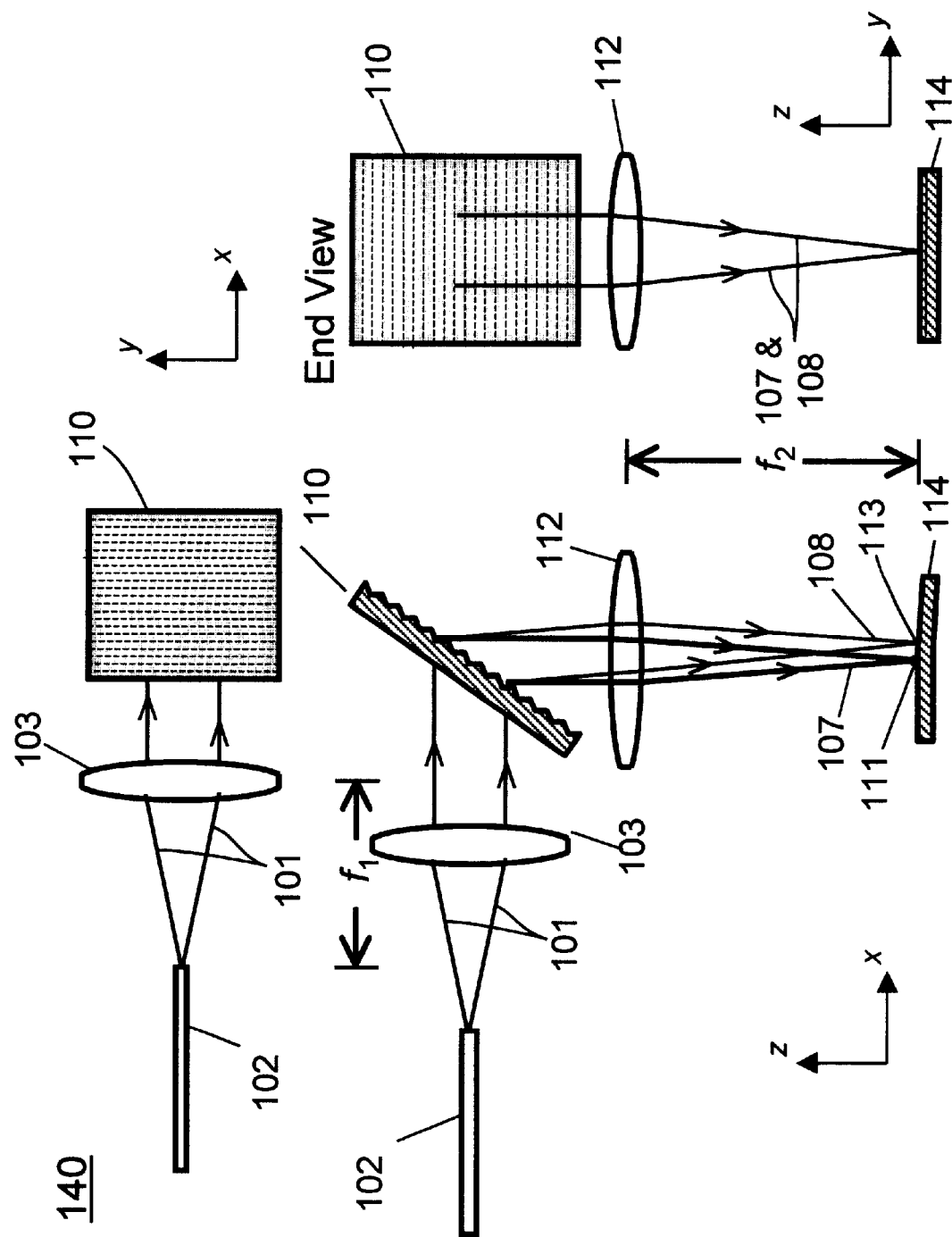
FIGS. 3a–3b each illustrate a top view, a side view and an end-view of a second preferred embodiment of a gain slope equalizer in accordance with the present invention.
Figure 3B:
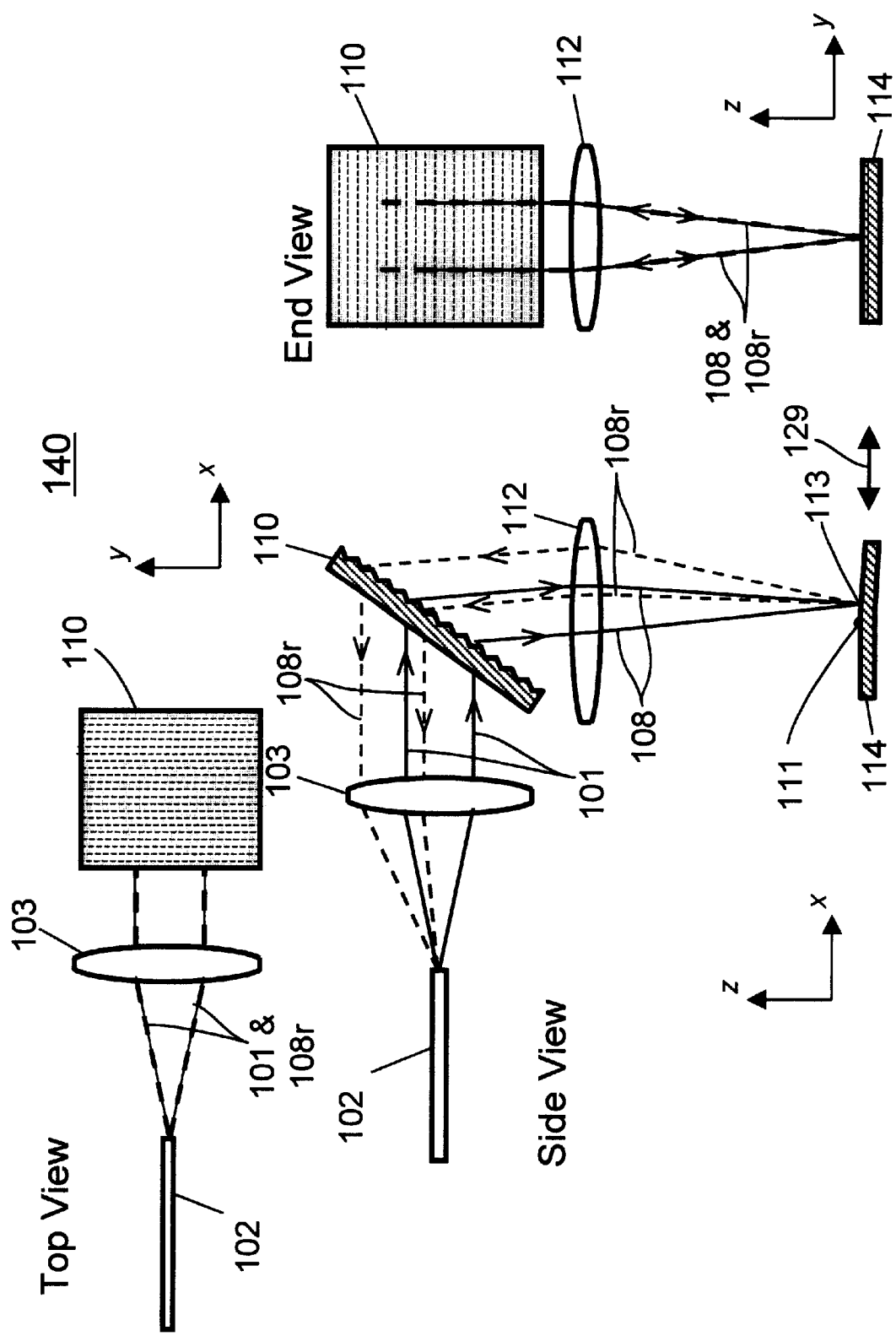

FIGS. 3a–3b each illustrate a top view, a side view and an end-view of a second preferred embodiment of a gain slope equalizer in accordance with the present invention. The gain slope equalizer 140 (FIGS. 3a–3b) is identical to the gain slope equalizer 100 (FIGS. 2a–2c) except that the reflective surface 114 comprising the gain slope equalizer 140 is not flat. The reflective surface 114 comprising the gain slope equalizer 140 may comprise two or more substantially flat but non-coplanar surfaces, may comprise a uniformly curved surface, or may comprise a surface of non-uniform or complexly varying curvature. Because of the non-planar shape of surface 114, the slope of this surface at focal point 111 of channel 107 is generally different from the slope at the focal point 113 of channel 108. As a result, the pathways of the reflected portions 107r and 108r of the channels within gain slope equalizer 140 generally differ from their pathways in gain slope equalizer 100. In the example illustrated in FIGS. 3a–3b, the slope of reflective surface 114 at point 111 is the same as in gain slope equalizer 100, and only the slope at point 113 differs between gain slope equalizer 100 and gain slope equalizer 140. However, the reflected surface may be oriented or shaped in some other fashion so as to give other slopes at the focal points 111 and 113 and at intermediate points.

FIG. 3b illustrates the pathways of the forward propagating channel 108 and the returning reflected channel 108r within the gain slope equalizer 140. The pathway of channel 108 within gain slope equalizer 140 is identical to its pathway within gain slope equalizer 100. However, in the example shown (FIG. 3b), the optical pathway of the returning reflected channel 108r is different between the gain slope equalizer 100 and the gain slope equalizer 140 because of the different slopes of reflective surface 114 at point 113. In the example shown, the channel 108r is reflected at a greater angle to the vertical in gain slope equalizer 140 than in gain slope equalizer 100, and, therefore, there is a lesser degree of overlap between channels 108 and 108r within gain slope equalizer 140 than within the gain slope equalizer 100. This lesser degree of overlap persists along the entire pathway from point 113 through lens 112, through transmission diffraction grating 110, through collimating lens 103 to the end face of fiber 102 at which point the returning reflected channel 108r is focused. As a result of this lesser degree of overlap between channels 108 and 108r within the gain slope equalizer 140 than within the gain slope equalizer 100, a greater proportion of the light of channel 108r returns to fiber 102 outside of its acceptance cone and, therefore, the channel 108r experiences a greater degree of attenuation within the gain slope equalizer 140. In this fashion, the degree of attenuation of any or all channels may be controlled or varied by the orientation or shape of the reflective surface 114.

Figure 4A:
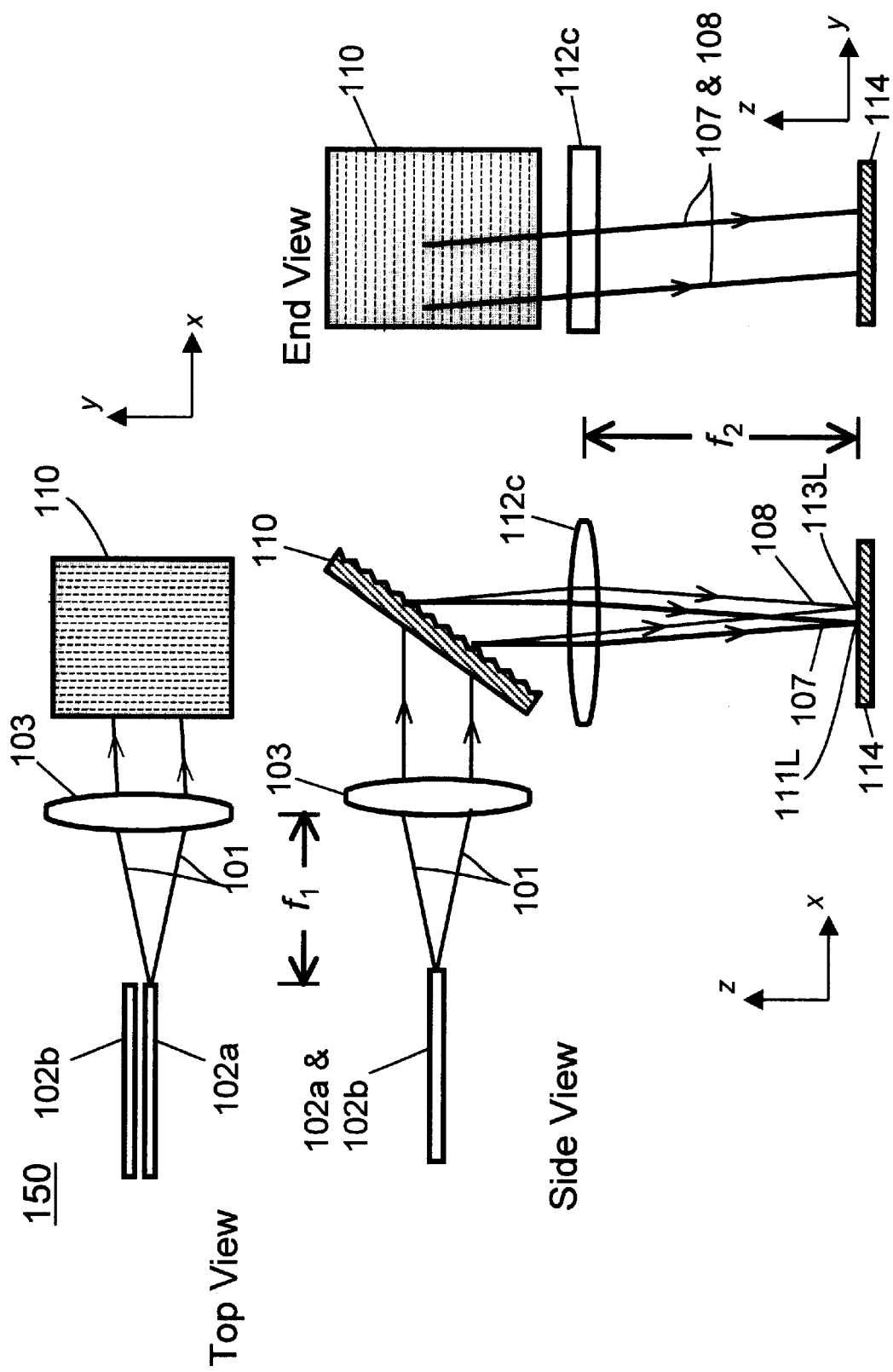
FIGS. 4a–4b each illustrate a top view, a side view and an end-view of a third preferred embodiment of a gain slope equalizer in accordance with the present invention.
Figure 4B:
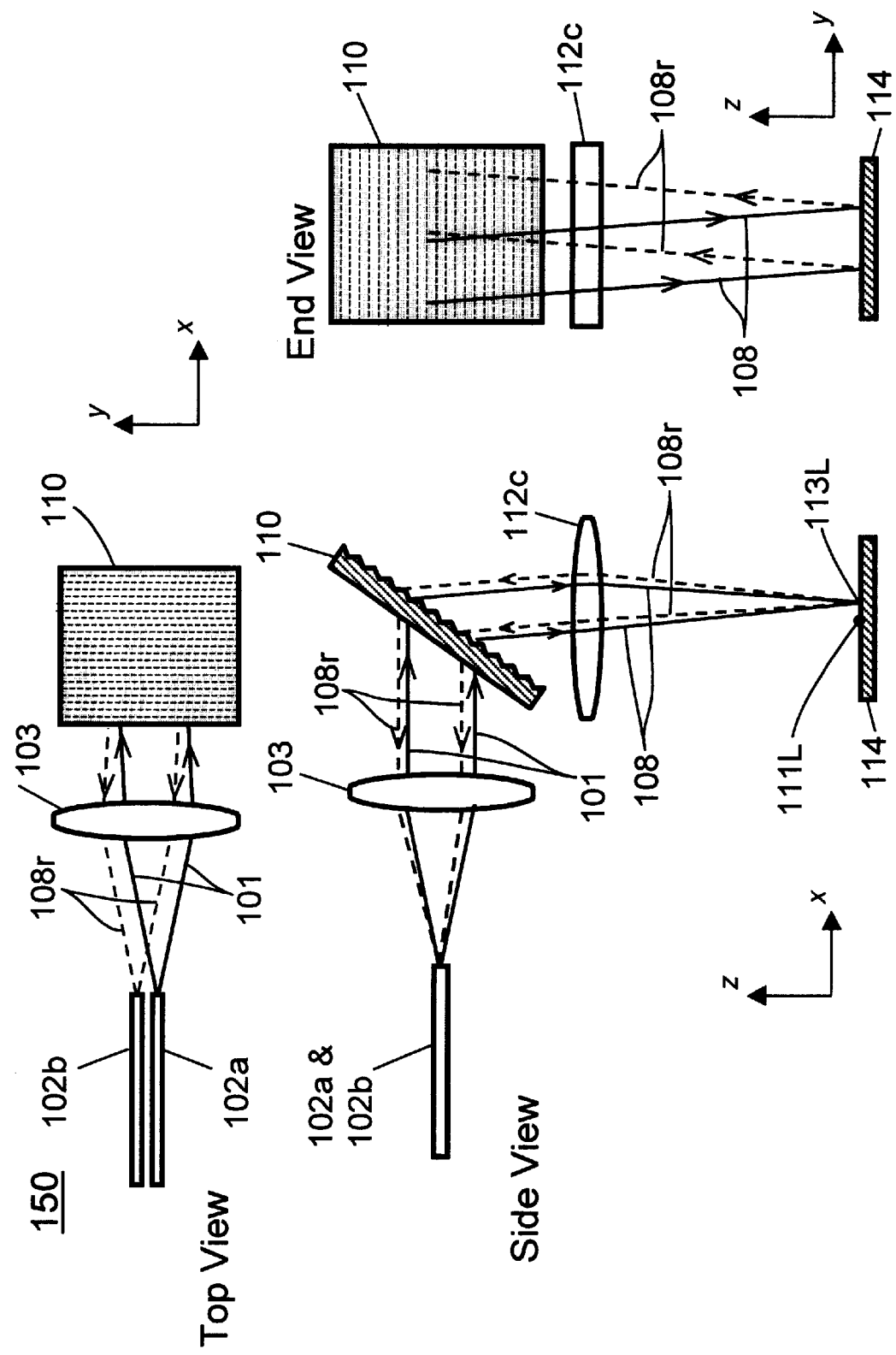

FIGS. 4a–4b each illustrate a top view, a side view and an end-view of a third preferred embodiment of a gain slope equalizer in accordance with the present invention. The gain slope equalizer 150 (FIGS. 4a–4b) is identical to the gain slope equalizer 100 (FIGS. 2a–2c) except that the single fiber 102 of the gain slope equalizer 100 is replaced by the pair of fibers 102a–102b and the focusing lens 112 of the gain slope equalizer 100 is replaced by the cylindrical lens 112c within the gain slope equalizer 150. In the gain slope equalizer 150 (FIGS. 4a–4b), the fiber 102a is utilized for input (i.e., for delivering optical signals to the equalizer 150) and the fiber 102b is utilized for output. These two fibers are disposed adjacent to one another and equidistant from and on opposite sides of the axis of collimating lens 103, defined as a line joining the front and rear foci of lens 103.

As in the gain slope equalizer 100 (FIG. 2a) and the gain slope equalizer 140 (FIG. 3a), the collimating lens 103 comprising gain slope equalizer 150 (FIG. 4a) receives a diverging light of composite optical signal 101 from the input fiber and transforms this light into a collimated light. However, in contrast to the operation of equalizers 100 and 140, the composite optical signal 101 intercepts lens 103 off-axis within the gain slope equalizer 150. Thus, the collimated light of composite optical signal 101 acquires a directional component parallel to the y-axis within the gain slope equalizer 150, which is observed in the top view and the side view of FIGS. 4a–4b. This directional component parallel to the y-axis persists through the remainder of the optical pathways of composite optical signal 101, of forward propagating channels 107 and 108 (FIG. 4a), and of reflected channels 107r and 108r such that the returning channels are focused onto the output fiber 102b (FIG. 4b). The cylindrical lens 112c comprising gain slope equalizer 150 does not possess any focusing power along the y-axis so that the directional component along the y-axis is not perturbed. Therefore, the channel 107 and the channel 108 focus at the focal line 111L and the focal line 113L, respectively, upon the reflective surface 114. Other aspects of the operation of the gain slope equalizer 150 are similar to those already described for the gain slope equalizer 100 and the gain slope equalizer 140.

Figure 5:
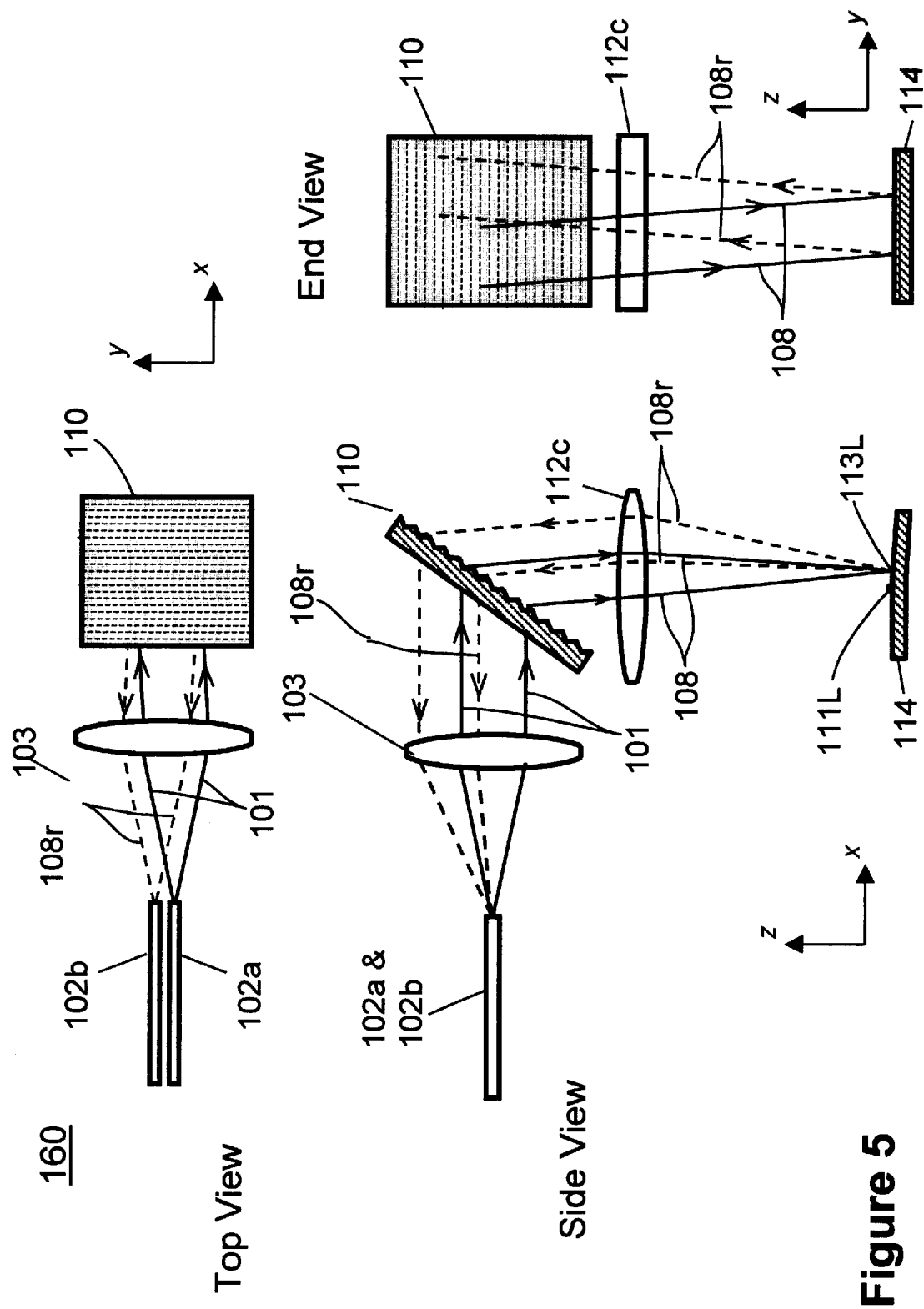
FIG. 5 illustrates a top view, a side view and an end-view of a fourth preferred embodiment of a gain slope equalizer in accordance with the present invention.

FIG. 5 illustrates a top view, a side view and an end-view of a fourth preferred embodiment of a gain slope equalizer in accordance with the present invention. The gain slope equalizer 160 (FIGS. 5) is identical to the gain slope equalizer 150 (FIGS. 4a–4b) except that the reflective surface 114 comprising equalizer 160 is not flat. The reflective surface 114 comprising the gain slope equalizer 160 may comprise a two or more substantially flat but non-coplanar surfaces, may comprise a uniformly curved surface, or may comprise a surface of non-uniform or complexly varying curvature. Because of the non-planar shape of the surface 114 comprising the gain slope equalizer 160, the degree of attenuation for the various optical channels may be varied via the shape and orientation of this surface, as previously described with reference to the gain slope equalizer 140 (FIGS. 3a–3b). Other aspects of the operation of the gain slope equalizer 160 (FIG. 5) are similar to those already described for the gain slope equalizer 150 (FIGS. 4a–4b).

Figure 6A:
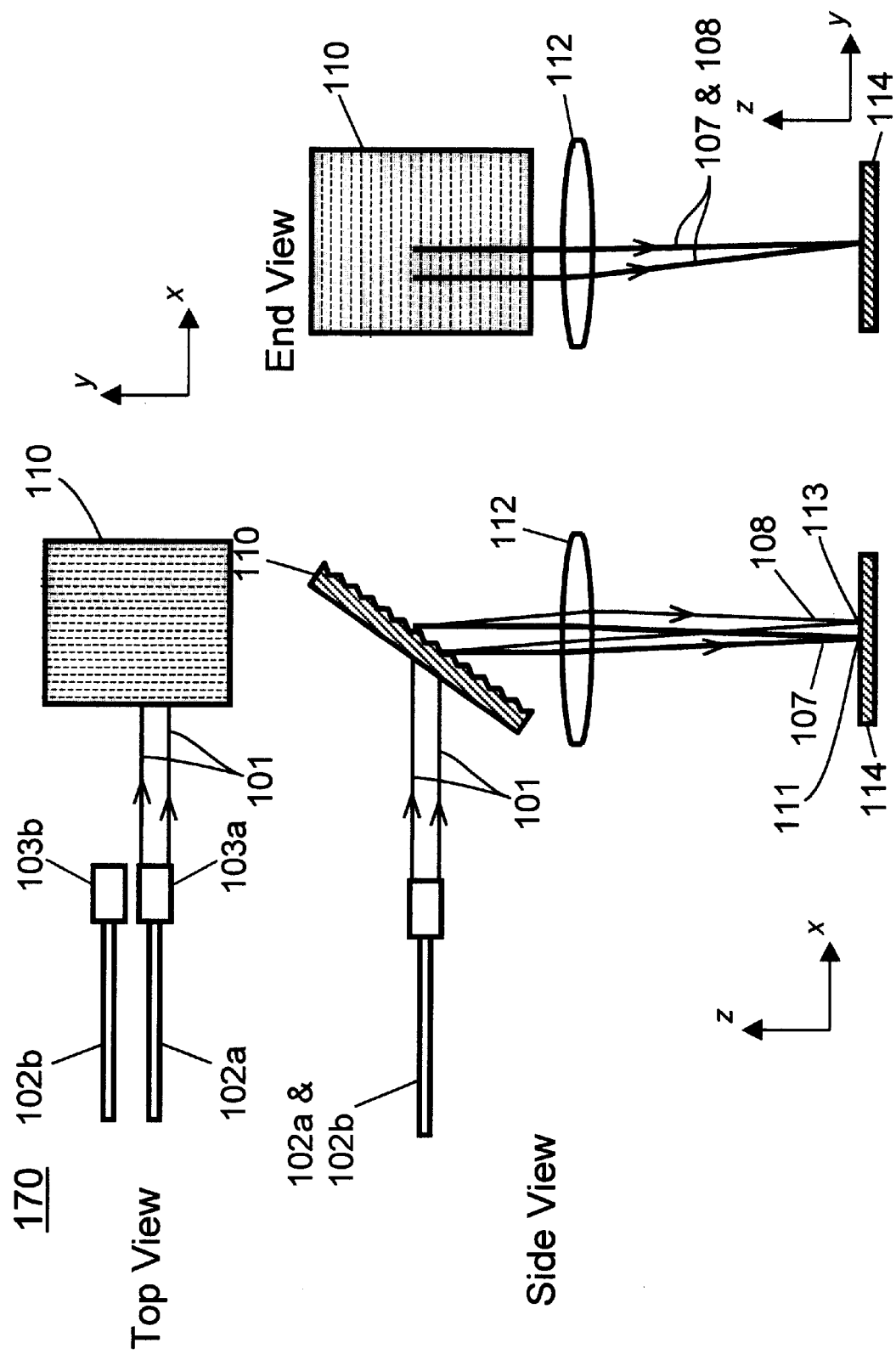
FIGS. 6a–6b each illustrate a top view, a side view and an end-view of a fifth preferred embodiment of a gain slope equalizer in accordance with the present invention.
Figure 6B:
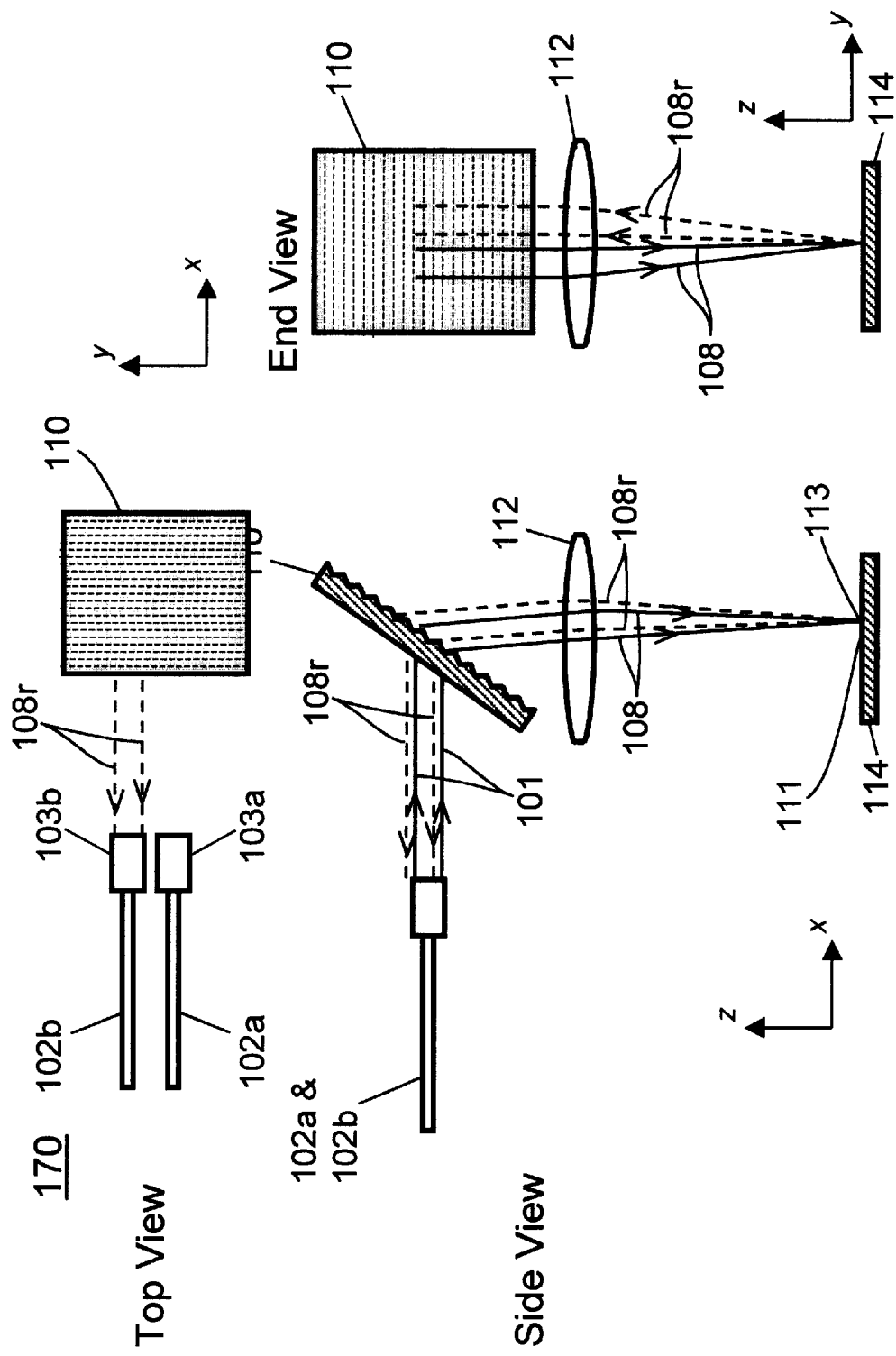

FIGS. 6a–6b each illustrate a top view, a side view and an end-view of a fifth preferred embodiment of a gain slope equalizer in accordance with the present invention. The gain slope equalizer 170 (FIGS. 6a–6b) is similar to the gain slope equalizer 150 (FIGS. 4a–4b) except that the collimating lens 103 of the gain slope equalizer 150 is replaced by the pair of optical fiber collimators 103a–103b within the gain slope equalizer 170 and the focusing lens 112 is a non-cylindrical lens. The fiber collimators 103a–103b, which are well known in the art, serve to produce a collimated beam from the composite optical signal 101 delivered by fiber 102a and to focus a collimated beam into the fiber 102b, respectively. The collimated composite optical signal 101 is transferred from collimator 103a to the transmission diffraction grating 110 along a path that is offset with respect to the path of the returning reflected channels. The pathway of one such returning reflected channel 108r is illustrated in FIG. 6b. The amount of such offset corresponds to the separation distance between the fibers 102a–102b in the gain slope equalizer 170.

The principle of operation of the gain slope equalizer 170 is similar to that of other embodiments of the present invention already described. In other words, the transmission diffraction grating 110 spatially disperses the various channels 107, 108, etc. according to their respective wavelengths; these dispersed channels are focused onto and reflected at different portions of the reflective surface 114; the reflected portions of the channels are then directed back through lens 112 and transmission diffraction grating 110 such that they are offset by different degrees with respect to the center of the fiber collimator 103b. These different degrees of offset with respect to the center of the fiber collimator 103b produce different degrees of attenuation for the various channels. However, in contrast to the previous embodiments of the present invention, the reflected portions 107r, 108r, etc. of the channels return to a collimator 103b different from the collimator 103a from which the original composite optical signal 101 is input to the equalizer 170. As shown in the end view of FIG. 6b, the forward-propagating channel 108 and the reflected channel 108r each pass off-center through the lens 112 with respect to the y-axis. The symmetry of the reflection from reflective surface 114 produces the offset along the y-axis that permits the reflected channel 108r, as well as any other reflected channels, to return to the collimator 103b.

Figure 7:
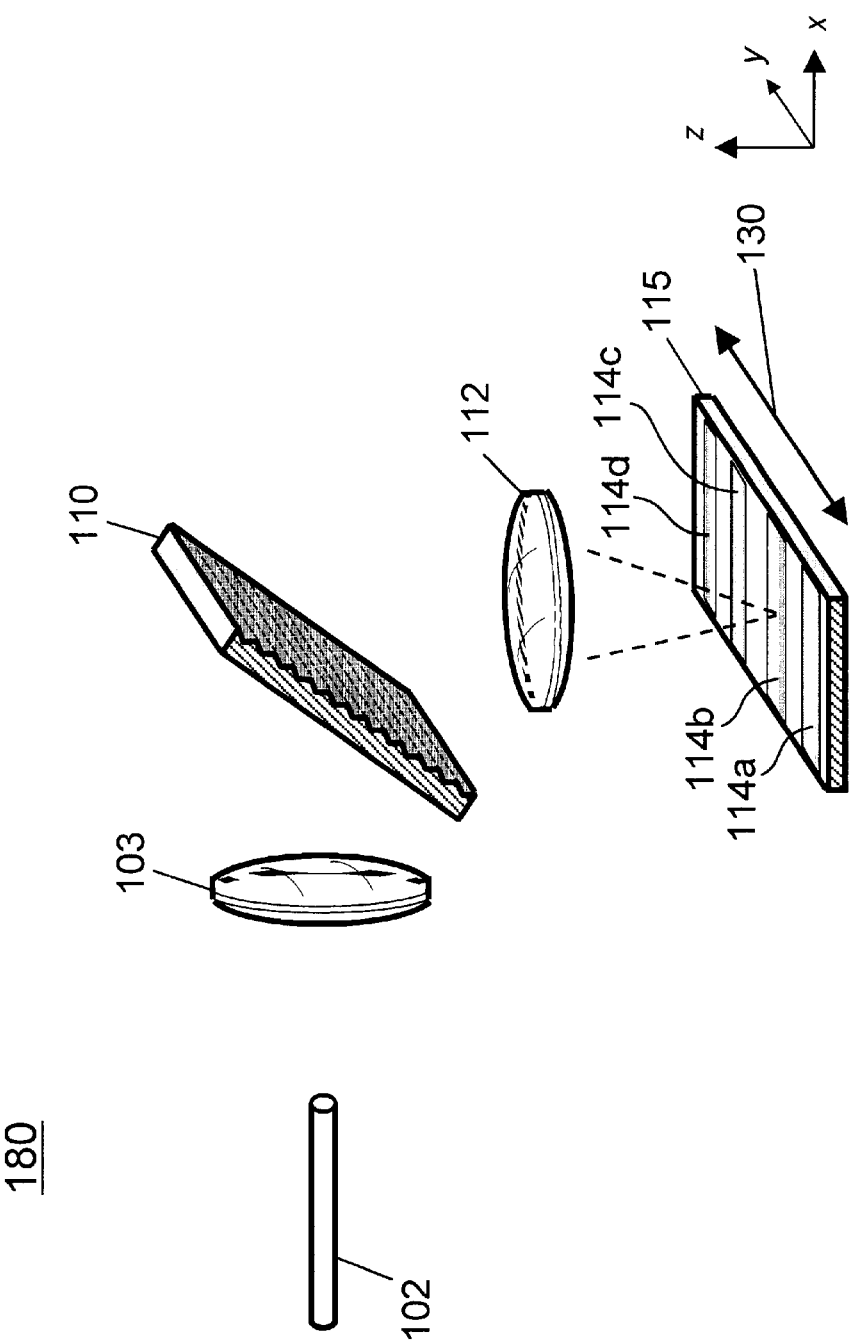
FIG. 7 illustrates a perspective view of a sixth preferred embodiment of a gain slope equalizer in accordance with the present invention.

FIG. 7 illustrates a perspective view of a sixth preferred embodiment of a gain slope equalizer in accordance with the present invention. The gain slope equalizer 180 (FIG. 7) is identical to the gain slope equalizer 100 (FIGS. 2a–2c)

except that the single reflective surface 114 of the gain slope equalizer 100 is replaced by a plurality of reflective surfaces 114a, 114b, 114c, . . . within the gain slope equalizer 180. Each of the reflective surfaces 114a, 114b, 114c, . . . comprises a different unique shape and/or orientation and all of these reflective surfaces are supported upon a movable surface 115. The movable surface 115 may be translated along the direction 130 (generally, parallel to the y-axis) such than one or another of the plurality of reflective surfaces 114a, 114b, 114c, . . . may be positioned within the light focusing region of lens 112 at any given time. In this way, the degree of variable optical attenuation produced by the equalizer 180 may be varied.

FIGS. 17a–17d each illustrate a top view and a side view of a seventh preferred embodiment of a gain slope equalizer in accordance with the present invention. The gain slope equalizer 190 (FIGS. 17a–17d) is similar to the gain slope equalizer 100 (FIGS. 2a–2c) except that the transmission grating 110 is replaced by a reflection grating 1710, the focusing lens 112 is omitted and the mirror 114 is repositioned so as to be optically coupled to the lens 103.

Figure 17A:
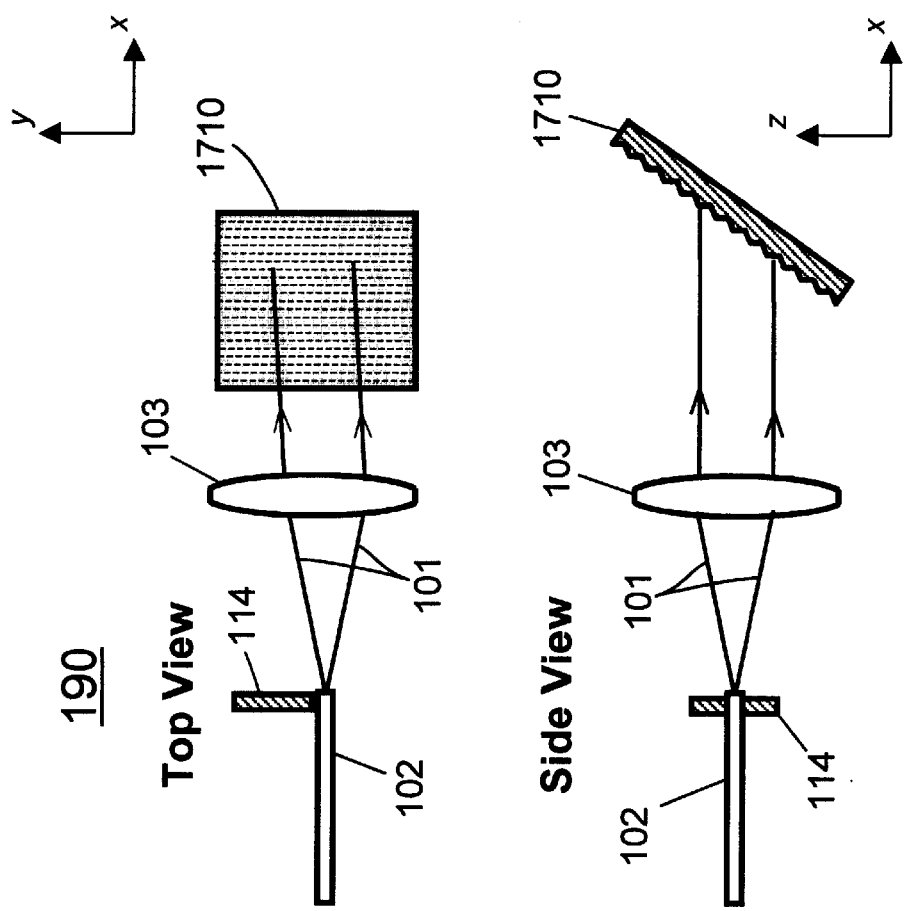
FIGS. 17a–17d are each a top view and a side view of a seventh preferred embodiment of a gain slope equalizer in accordance with the present invention.
Figure 17B:
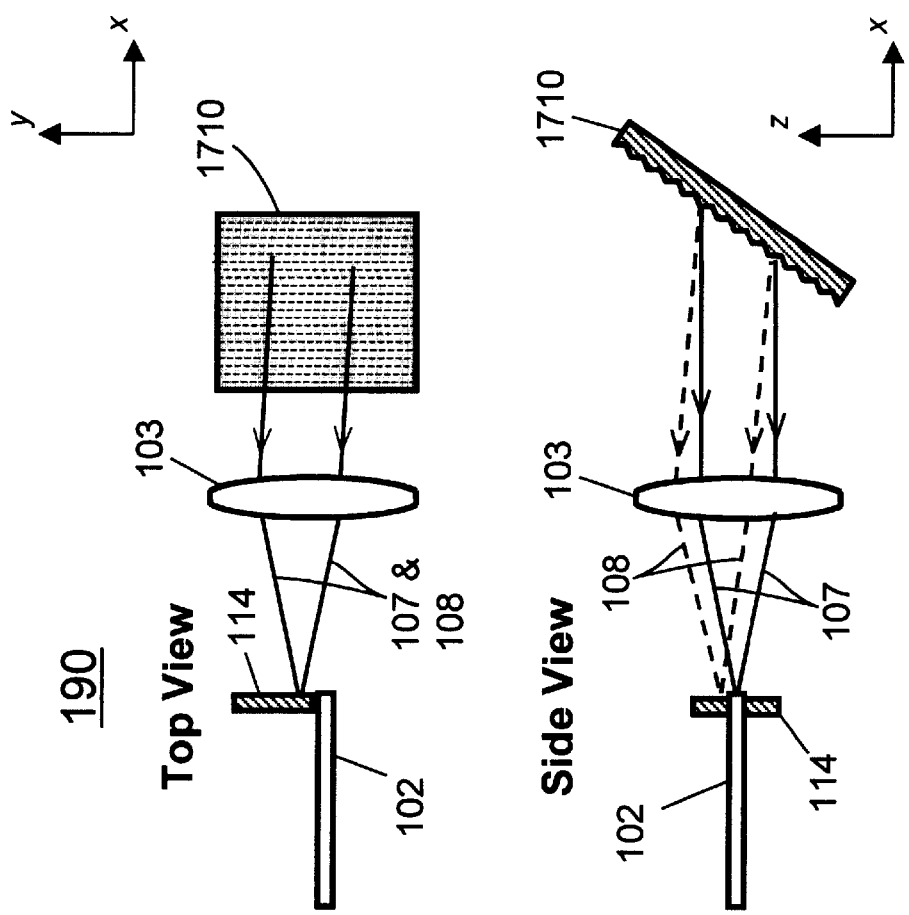
Figure 17C:
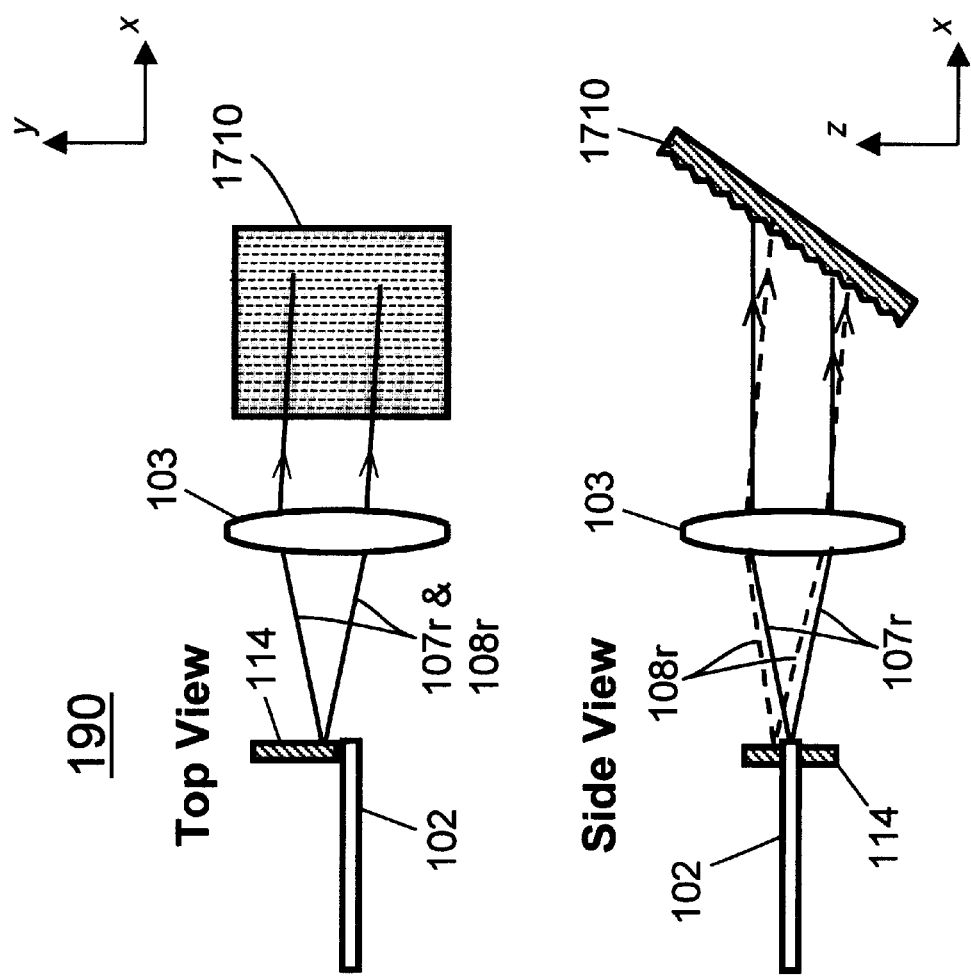
Figure 17D:
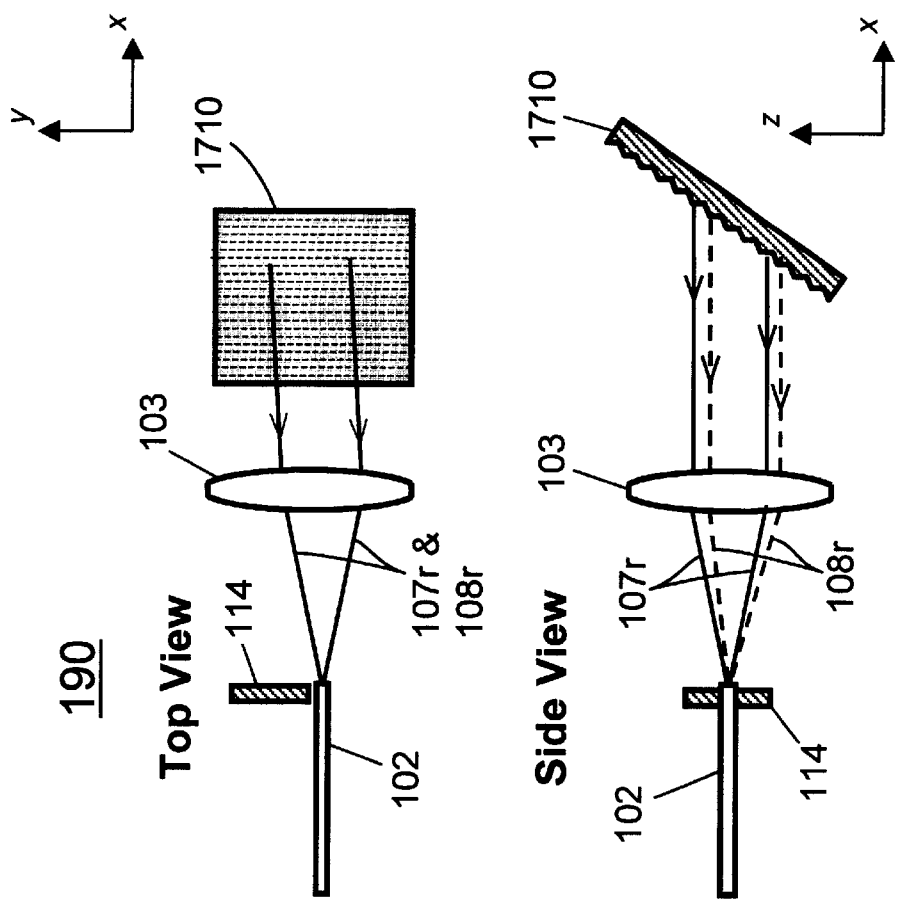

FIG. 17a illustrates the pathway of a WDM composite optical signal 101 from the input fiber to the reflection grating 1710. Upon interacting with the reflection grating 1710, the individual channels comprising the WDM composite optical signal 101 are diffracted along different directions according to their respective wavelengths. FIG. 17b illustrates the separate pathways of two diffracted channels 107–108 from the reflection grating 1710 through the collimating lens 103 to the reflective surface 114. These channels correspond to the relatively longer wavelength $\lambda_{107}$ and the relatively shorter wavelength $\lambda_{108}$, respectively, as defined in FIG. 1. FIG. 17c illustrates the pathways of the returning reflected portions 107r–108r of light of wavelength $\lambda_{107}$ and of wavelength $\lambda_{108}$, respectively, from the reflective surface 114 through the collimating lens 103 back to the reflection grating 1710. Finally, FIG. 17d illustrates the pathways of the returning reflected portions 107r–108r from the reflection grating 1710 through the collimating lens 103 back to the input fiber 102.

The principal of operation of the gain slope equalizer 190 (FIGS. 17a–17d) is similar to that previously described except that the reflection grating 1710 back-diffracts the channels 107–108 back through the collimating lens 103. Therefore, the collimating lens 103 performs the additional functions, relative to its operation within the gain slope equalizer 100, of focusing the channels 107–108 onto the reflective surface 114 (FIG. 17b) and of collimating the returning reflected portions 107r–108r of the light comprising these channels back onto the grating 1710 (FIG. 17c). As shown in FIGS. 17a–17d, the dispersion of the reflection grating 1710 is within the vertical x-z plane. Also, to prevent the diffracted channels 107–108 from entering the input fiber 102, the fiber 102 and the reflective surface 114 are offset along the horizontal y-dimension so as to be disposed on opposite sides of the axis of collimating lens 103. For instance, the reflective surface 114 is shown disposed behind the input fiber 102 within each of the side views of FIGS. 17a–17d. Because of this offset along the y-dimension, there is a light propagation component parallel to the y-dimension between the lens 103 and the grating 1710, as shown within each of the top views of FIGS. 17a–17d.

Figure 9A:
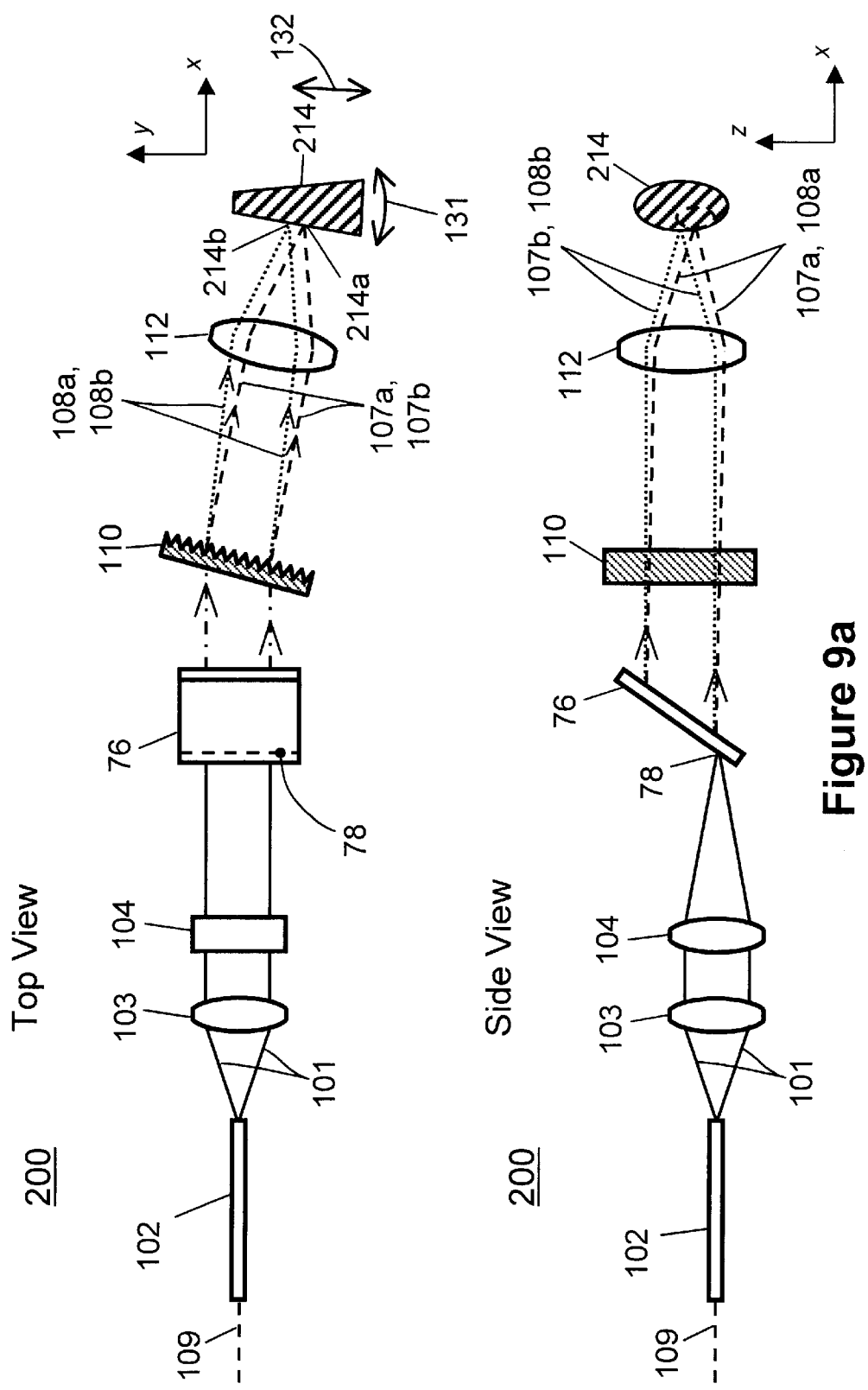
FIGS. 9a–9b illustrate an equalizer/compensator which utilizes the gain slope equalizer in accordance with the present invention.
Figure 9B:
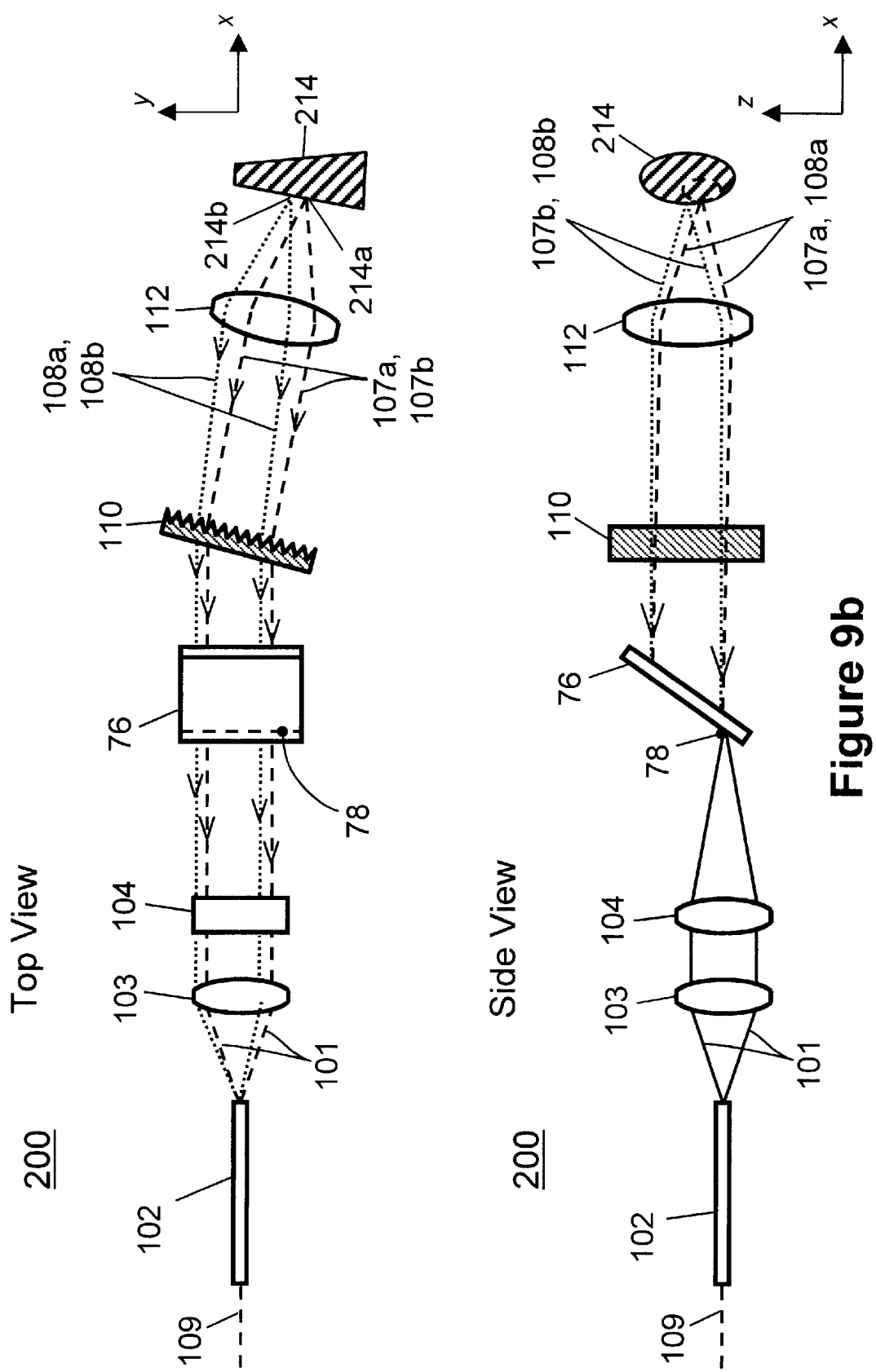

FIGS. 9a–9b illustrate an equalizer/compensator which utilizes the gain slope equalizer in accordance with the present invention. The equalizer/compensator 200 is capable of compensating gain slope, chromatic dispersion and chromatic dispersion slope. FIG. 9a illustrates signal ray paths prior to reflection at a mirror 214 and FIG. 9b illustrates the returning, reflected ray paths subsequent to this reflection. The top and bottom drawings of FIGS. 9a–9b show a top and side view, respectively, of the equalizer/compensator 200. In the equalizer/compensator 200 (FIGS. 9a–9b), a wavelength-division multiplexed composite signal 101 is output from fiber 102, is collimated by collimator lens 103 and is then brought to a line focus at the beam waist 78 of VIPA 76 by the cylindrical lens 104.

As discussed in further detail in the following discussion, the VIPA 76 of the equalizer/compensator 200 spatially disperses the wavelengths comprising each one of the channels of composite signal 101, such that rays of each wavelength emanate from the VIPA along ray paths which are parallel to one another but of a different direction than rays of any other wavelength comprising the same channel. For instance, in the lower drawing of FIG. 9a, ray paths of a relatively longer wavelength 107a and ray paths of a relatively shorter wavelength 107b of the first channel 107 are illustrated by dashed and dotted lines, respectively. Because the thickness of VIPA 76 satisfies the WDM-matching FSR thickness (described in greater detail in the following), then, immediately upon output from VIPA 76, the paths of the relatively longer wavelength 107a of the first channel overlap those of a relatively longer wavelength 108a of the second channel 108. Likewise, the ray paths of the relatively shorter wavelength 107b of the first channel overlap those of a relatively shorter wavelength 108b of the second channel 108.

After being output from VIPA 76, the separated wavelengths are passed through a transmission diffraction grating 110 (FIG. 9a). Upon passing through the transmission diffraction grating 110, the paths of the various channels are spatially separated from one another according to their respective wavelengths. The dispersion plane of transmission diffraction grating 110 is not parallel to that of the VIPA 76, however. In the illustrative configuration illustrated in FIGS. 9a–9b, these two dispersion planes are perpendicular to one another. In other words, the wavelength separation produced by the VIPA 76 is within the x-z plane and the wavelength separation produced by the transmission diffraction grating 110 is within the x-y plane. Thus, as shown in the top drawing of FIG. 9a, upon emerging from the transmission diffraction grating 110, the wavelengths comprising the first channel 107 are output along a different horizontal direction from those of the second channel 108. For instance, the top drawing of FIG. 9a illustrates the separation, within a horizontal (i.e., x-y) plane, of the path of the relatively longer wavelength 107a of the first channel 107 from that of the relatively longer wavelength 108a of the second channel 108. In similar fashion, the relatively shorter wavelengths 107b, 108b of each channel are spatially dispersed within a horizontal plane.

The spatially dispersed wavelengths 107a–107b of the first channel of composite optical signal 101 and the spatially separated wavelengths 108a–108b of the second channel of composite optical signal 101 are focused by lens 112 onto the surface of mirror 214. Because of the spatial dispersion within a horizontal plane by the transmission diffraction grating 110, each channel intercepts the mirror 214 at a different position within a plane parallel to the x-y coordinate plane. The mirror 214 may comprise any one of a number of complex shapes. In the preferred embodiment, the mirror 214 has a shape that is approximately that of a cone with its long axis disposed horizontally.

The mirror 214 reflects the light rays of each wavelength such that all such rays are directed back through lens 112 and are re-collimated by the lens 112. In side view (lower drawing of FIG. 9a), the cross section of mirror 214 is similar to a simple convex mirror or concave mirror such that the relatively longer wavelengths 107a, 108a comprising each channel are reflected along different directions from the relatively shorter wavelengths 107b, 108b of each channel. In particular, after reflection, the difference between the vertical directional component of the relatively longer wavelength and of the relatively shorter wavelength of each channel is such that the wavelengths are returned to different virtual images of the beam waist of VIPA 76 as described in greater detail in the following discussion. However, because of the approximate conical shape of mirror 214, each of the channels 107–108 intercepts the mirror 214 at a region with a different curvature in vertical cross section. For instance, as shown in FIGS. 9a–9b, the light rays 107a–107b comprising a first channel 107 intercept the mirror 214 at position 214a and those light rays 108a–108b comprising a second channel 108 intercept the mirror 214 at position 214b. However, in side view (lower drawings of FIG. 9a–9b), the position 214b of mirror 214 comprises a shorter radius of curvature than does the position 214a.

In the top view (top drawing of FIG. 9b), the reflected light of each wavelength that returns to the transmission diffraction grating 110 comprises an angle of incidence that varies from channel to channel depending upon the slope of the mirror 214 as viewed in the top view or in the x-y plane. Therefore, the paths of the returning reflected channels are offset in the y-direction to varying degrees relative to their respective pathways prior to reflection. The return, reflected pathways of the two channels 107 and 108 are illustrated by dashed and dotted lines, respectively, in the upper drawing of FIG. 9b. The channel 107 comprises the wavelengths 107a–107b and the channel 108 comprises the wavelengths 108a–108b.

In the side view (lower drawing of FIG. 9b), the relatively longer and relatively shorter wavelengths comprising each channel are returned to respective different virtual images of the beam waist of VIPA 76 so as to comprise different optical path lengths through VIPA 76 and thereby acquire compensatory chromatic dispersion, as described in greater detail in the following discussion. Since the light of the various channels are reflected from positions along mirror 214 with possibly different curvatures in the vertical or x-z plane, the degree of compensatory chromatic dispersion can vary in a systematic fashion from channel to channel. The light of all wavelengths of all channels then propagates in the reverse direction through the VIPA 76 so as to be output from the beam waist 78. The light is then collimated by cylindrical lens 104 and refocused into the end face of fiber 102 by lens 103.

Figure 10:
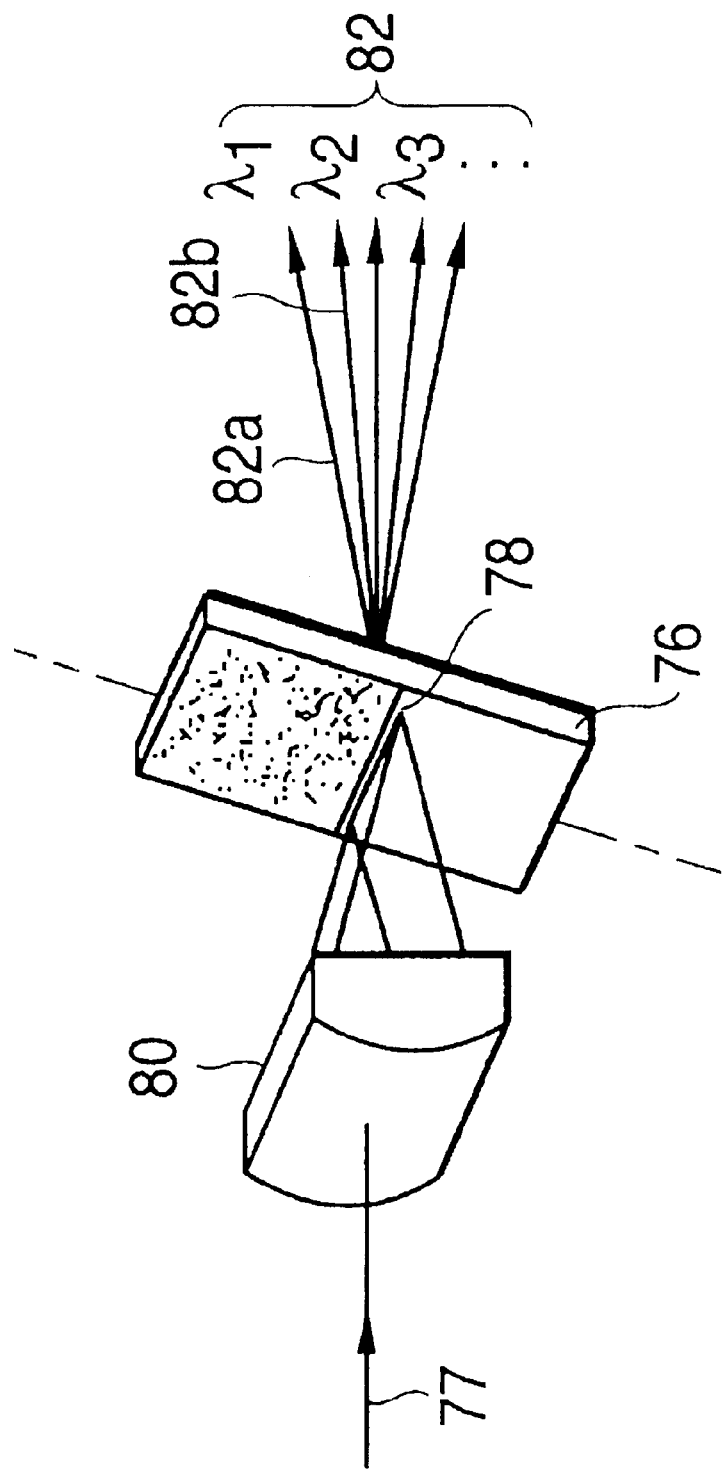
FIG. 10 is a diagram illustrating a Virtually Imaged Phased Array (VIPA), that comprises a component of the equalizer/compensator in accordance with the present invention.

To fully describe the dispersion compensation operation of the equalizer/compensator 200, it is necessary to understand the operation of the VIPA 76. The following discussion and FIGS. 10–14b provide more detailed information on the operation of the VIPA 76. FIG. 10 is a diagram illustrating a Virtually Imaged Phased Array (VIPA) that comprises a component of the equalizer/compensator 200 in accordance with the present invention. Hereinafter, the terms "Virtually Imaged Phased Array" and "VIPA" may be used interchangeably. The VIPA 76 is disclosed in U.S. Pat. No. 5,930,045 and in U.S. Pat. No. 6,028,706, both of which are incorporated herein by reference.

Referring now to FIG. 10, a VIPA 76 is preferably made of a thin plate of glass. An input light 77 is focused into a line 78 with a lens 80, such as a semi-cylindrical lens, so that input light 77 travels into VIPA 76. Line 78 is hereinafter referred to as "focal line 78". Input light 77 radially propagates from focal line 78 to be received inside VIPA 76. The VIPA 76 then outputs a luminous flux 82 of collimated light, where the output angle of luminous flux 82 varies as the wavelength of input light 77 changes. For example, when input light 77 is at a wavelength $\lambda_1$, VIPA 76 outputs a luminous flux 82a at wavelength $\lambda_1$ in a specific direction. When input light 77 is at a wavelength $\lambda_2$, VIPA 76 outputs a luminous flux 82b at wavelength $\lambda_2$ in a different direction. Therefore, VIPA 76 produces luminous fluxes 82a and 82b that are spatially distinguishable from each other.

Figure 11:
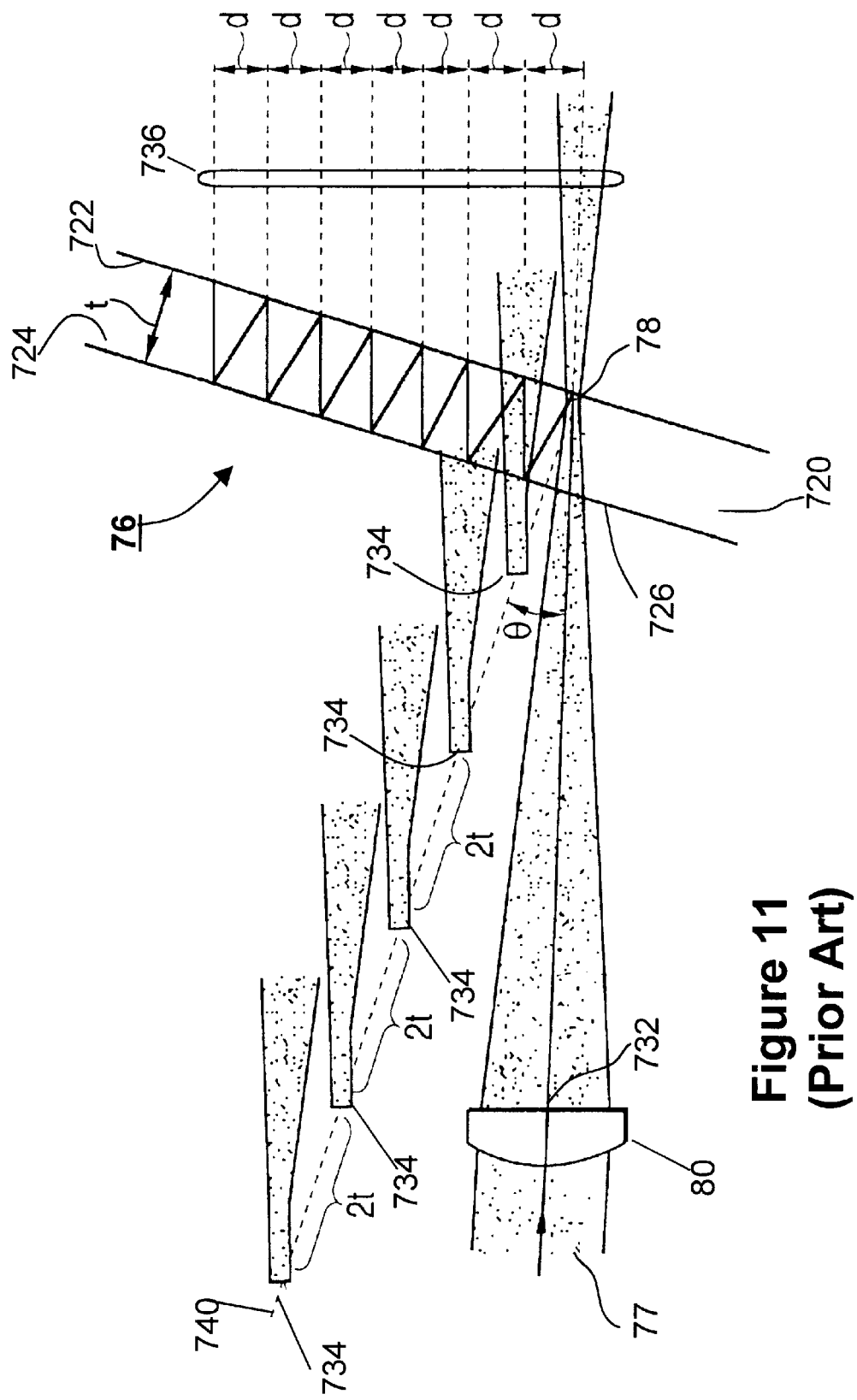
FIG. 11 is a detailed diagram illustrating the light path through and operation of the VIPA.

FIG. 11 is a detailed diagram illustrating VIPA 76 and light paths therein and therethrough. Referring now to FIG. 11, VIPA 76 includes a plate 720 made of, for example, glass, and having reflecting films 722 and 724 thereon. Reflecting film 722 preferably has a reflectance of approximately 95% or higher, but less than 100%. Reflecting film 724 preferably has a reflectance of approximately 100%. A radiation window 726 is formed on plate 720 and preferably has a reflectance of approximately 0% reflectance.

Input light 77 is focused into focal line 78 by lens 80 through radiation window 726, to subsequently undergo multiple reflection between reflecting films 722 and 724. Focal line 78 is preferably on the surface of plate 720 to which reflecting film 722 is applied. Thus, focal line 78 is essentially line focused onto reflecting film 722 through radiation window 726. The width of focal line 78 can be referred to as the "beam waist" of input light 77 as focused by lens 80. Thus, the VIPA 76 illustrated in FIG. 11 focuses the beam waist of input light 77 onto the far surface (that is, the surface having reflecting film 722 thereon) of plate 720. By focusing the beam waist on the far surface of plate 720, the VIPA 76 of the present invention reduces the possibility of overlap between (i) the area of radiation window 726 on the surface of plate 720 covered by input light 77 as it travels through radiation window 726 and (ii) the area on reflecting film 724 covered by input light 77 when input light 77 is reflected for the first time by reflecting film 724. It is desirable to reduce such overlap to ensure proper operation of the VIPA 76.

In FIG. 11, an optical axis 732 of input light 77 has a small tilt angle $\theta$ with respect to a line 740 perpendicular to the plane of plate 720. Assuming, for purposes of illustration, that the reflectance of film 722 is 95% and the reflectance of film 724 is 100%, then, upon the first reflection off of reflecting film 722, 5% of the light passes through reflecting film 722 and diverges after the beam waist, and 95% of the light is reflected towards reflecting film 724. After being reflecting by reflecting film 724 for the first time, the light again hits reflecting film 722 but is displaced by an amount d. Then, 5% of the light passes through reflecting film 722. In a similar manner, as illustrated in FIG. 11, the light is split into many paths with a constant separation d. The beam shape in each path forms so that the light diverges from virtual images 734 of the beam waist 78. Virtual images 734 are located with constant spacing 2t along a line 740 that is normal to plate 720, where t is the thickness of plate 720. The positions of the beam waists in virtual images 734 are self-aligned, and there is no need to adjust individual positions. The lights diverging from virtual images 734 interfere with one other and form collimated light 736 that propagates in a direction that changes in accordance with the wavelength of input light 77.

The spacing of light paths is d=2t sin $\theta$, and the difference in the path lengths between adjacent beams is 2t cos $\theta$. The angular dispersion of the VIPA 76 is proportional to the ratio of these two numbers, which is cot $\theta$. As a result, a VIPA 76 produces a significantly large angular dispersion.

The plate 720 has reflecting surfaces 722 and 724 thereon. Reflecting surfaces 722 and 724 are in parallel with each other and spaced by the thickness t of plate 720 and are typically reflecting films deposited on plate 720. As previously described, reflecting surface 724 has a reflectance of approximately 100%, except in radiation window 726, and reflecting surface 722 has a reflectance of approximately 95% or higher. Therefore, reflecting surface 722 has a transmittance of approximately 5% or less so that approximately 5% of less of light incident on reflecting surface 722 will be transmitted therethrough and approximately 95% or more of the light will be reflected. The reflectances of reflecting surfaces 722 and 724 can easily be changed in accordance with the specific VIPA application. However, generally, reflecting surface 722 should have a reflectance that is less than 100% so that a portion of incident light can be transmitted therethrough. This reflectance need not be constant along the reflecting film 722.

The reflecting surface 724 has radiation window 726 thereon. Radiation window 726 allows light to pass therethrough, and preferably has no reflectance, or a very low reflectance. Radiation window 726 receives input light 77 to allow input light 77 to be received between, and reflected between, reflecting surfaces 722 and 724.

A VIPA 76 has strengthening conditions that are characteristics of the design of the VIPA 76. The strengthening conditions increase the interference of the output lights so that a luminous flux is formed. The strengthening conditions of the VIPA 76 are represented by the following equation $$2t \cos \Phi = m\lambda$$

in which $\Phi$ indicates the propagation direction of the resulting luminous flux as measured from a line perpendicular to the surface of reflecting surfaces 722 and 724, $\lambda$ indicates the wavelength of the input light, t indicates the distance between the reflecting surfaces 722 and 724, and m indicates an integer. Therefore, if t is constant and m is assigned a specific value, then the propagation direction $\Phi$ of the luminous flux formed for input light having wavelength $\lambda$ can be determined.

More specifically, input light 77 is radially dispersed from focal line 78 through a specific angle. Therefore, input light having the same wavelength will be traveling in many different directions from focal line 78, to be reflected between reflecting surfaces 722 and 724. The strengthening conditions of the VIPA 76 cause light traveling in a specific direction to be strengthened through interference of the output lights to form a luminous flux having a direction corresponding to the wavelength of the input light. Light traveling in a different direction than the specific direction required by the strengthening condition is weakened by the interference of the output lights.

Figure 12:
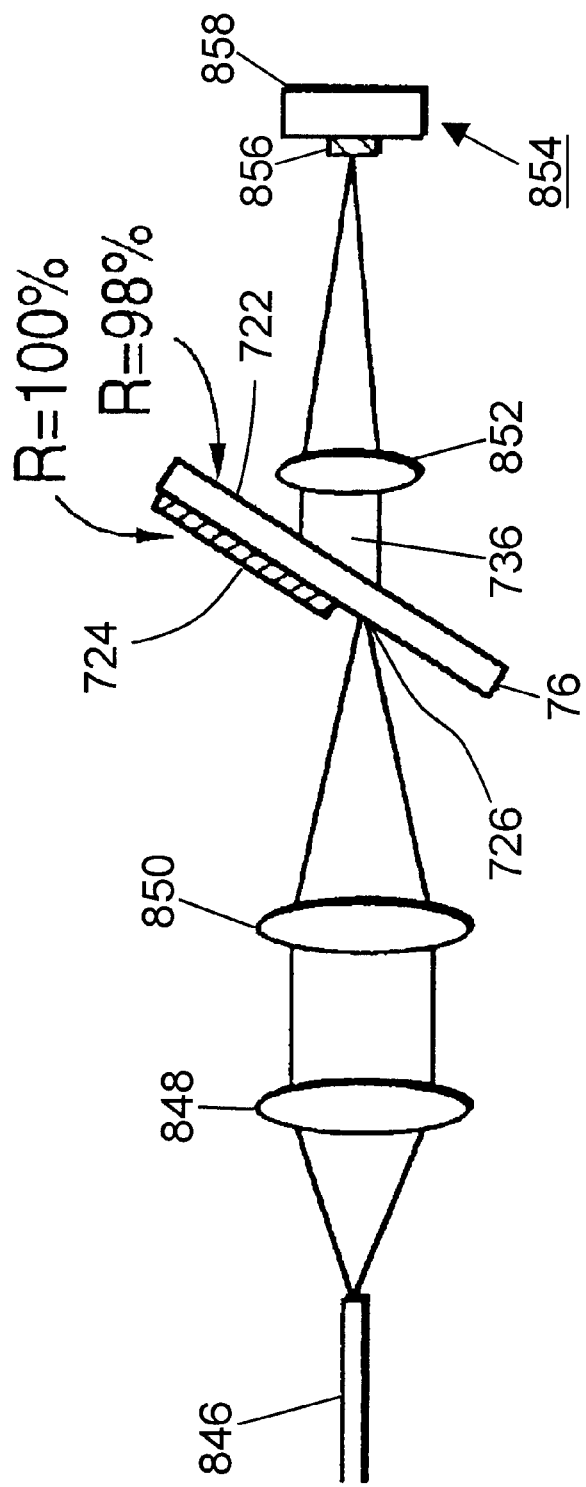
FIG. 12 is a diagram illustrating a prior-art apparatus that uses a VIPA and a light-returning device to produce chromatic dispersion.

FIG. 12 is a diagram of a prior-art apparatus that uses a VIPA and a light returning device to produce chromatic dispersion. As illustrated in FIG. 12, a light is output from a fiber 846, collimated by a collimating lens 848 and line-focused into VIPA 76 through radiation window 726 by a cylindrical lens 850. The VIPA 76 then produces a collimated light 736 that is focused by a focusing lens 852 onto a mirror 854. Mirror 854 can be a mirror portion 856 formed on a substrate 858. Mirror 854 reflects the light back through focusing lens 852 into VIPA 76. The light then undergoes multiple reflections in VIPA 76 and is output from radiation window 726. The light output from radiation window 726 travels through cylindrical lens 850 and collimating lens 848 and is received by fiber 846.

Therefore, light is output from VIPA 76 and reflected by mirror 854 back into VIPA 76. The light reflected by mirror 854 travels through the path that is nearly opposite in direction to the path through which it originally traveled. As described in greater detail herein following, different wavelength components in the light are focused onto different positions on mirror 854, and are reflected back to VIPA 76. As a result, different wavelength components travel different distances, to thereby produce chromatic dispersion.

Figure 13:
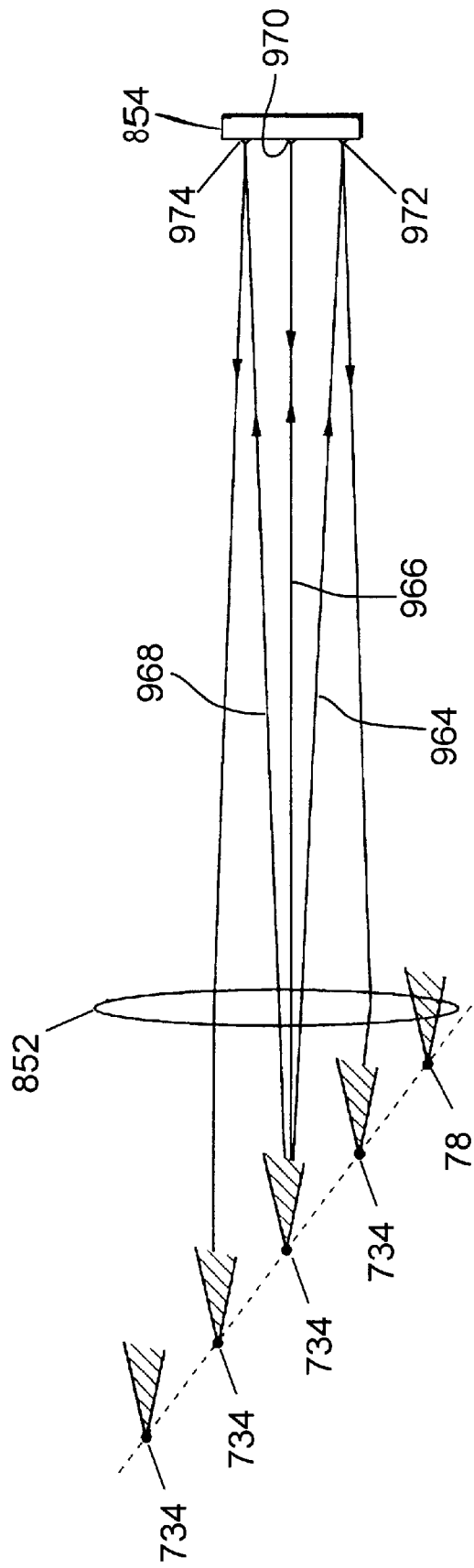
FIG. 13 is a more detailed diagram illustrating the operation of the apparatus in FIG. 12.

FIG. 13 is diagram illustrating the operation of the apparatus in FIG. 12. Assume a light having various wavelength components is received by VIPA 76. As illustrated in FIG. 13, VIPA 76 will cause the formation of virtual images 734 of beam waist 78, where each virtual image 734 "emits" light. As illustrated in FIG. 13, focusing lens 852 focuses the different wavelength components in a collimated light from VIPA 76 at different points on mirror 854. More specifically, a longer wavelength 964 focuses at point 972, a center wavelength 966 focuses at point 970, and a shorter wavelength 968 focuses at point 974. Then, longer wavelength 964 returns to a virtual image 734 that is closer to beam waist 78, as compared to center wavelength 966. Shorter wavelength 968 returns to a virtual image 734 that is farther from beam waist 78, as compared to center wavelength 966. Thus, the arrangement provides for normal dispersion.

Mirror 854 is designed to reflect only light in a specific interference order, and light in any other interference order should be focused out of mirror 854. More specifically, as previously described, a VIPA 76 will output a collimated light. This collimated light will travel in a direction such that the optical path length difference between subsequent virtual images contributing to the collimated light is m$\lambda$, where m is an integer. The $m^{th}$ order of interference is defined as an output light corresponding to m. Each order comprises a plurality of wavelength components and the wavelength components of one order are repeated in any other order. However, collimated lights at the same wavelength for different interference orders generally travel in different directions and are therefore focused at different positions. Thus, the mirror 854 can be made to reflect only light from a single interference order back into VIPA 76.

A wavelength division multiplexed light usually includes many channels, wherein each channel has a center wavelength and the center wavelengths are usually spaced apart by a constant frequency spacing. If the thickness t between first and second reflective films 722 and 724 of VIPA 76 is set at a specific value, the arrangement will be able to simultaneously compensate for dispersion in each channel. The thickness t which permits such simultaneous dispersion compensation is such that all of the wavelength components corresponding to the center wavelengths have the same output angle from VIPA 76 and thus the same focusing position on mirror 854. This is possible when the thickness t is set so that, for each channel, the round-trip optical length through VIPA 76 traveled by the wavelength component corresponding to the center wavelength is a multiple of the center wavelength of each channel, that is, t is such that the quantity 2 nt cos $\theta$ is an integer multiple of the center wavelength of each channel. This amount of thickness t is herein referred to as the "WDM matching free spectral range thickness", or "WDM matching FSR thickness".

Therefore, in FIG. 13, with the thickness t set to the WDM matching FSR thickness, VIPA 76 and focusing lens 852 will cause (a) the wavelength component corresponding to the center wavelength of each channel to be focused at point 970 on mirror 854, (b) the wavelength component corresponding to the longer wavelength component of each channel to be focused at point 972 on mirror 854, and (c) the wavelength component corresponding to the shorter wavelength component of each channel to be focused at point 974 on mirror 854. Therefore, VIPA 76 can be used to compensate for chromatic dispersion in all channels of a wavelength division multiplexed light. However, this prior-art VIPA-based dispersion-compensating apparatus does not compensate for dispersion slope or EDFA gain slope.

Figure 14A:
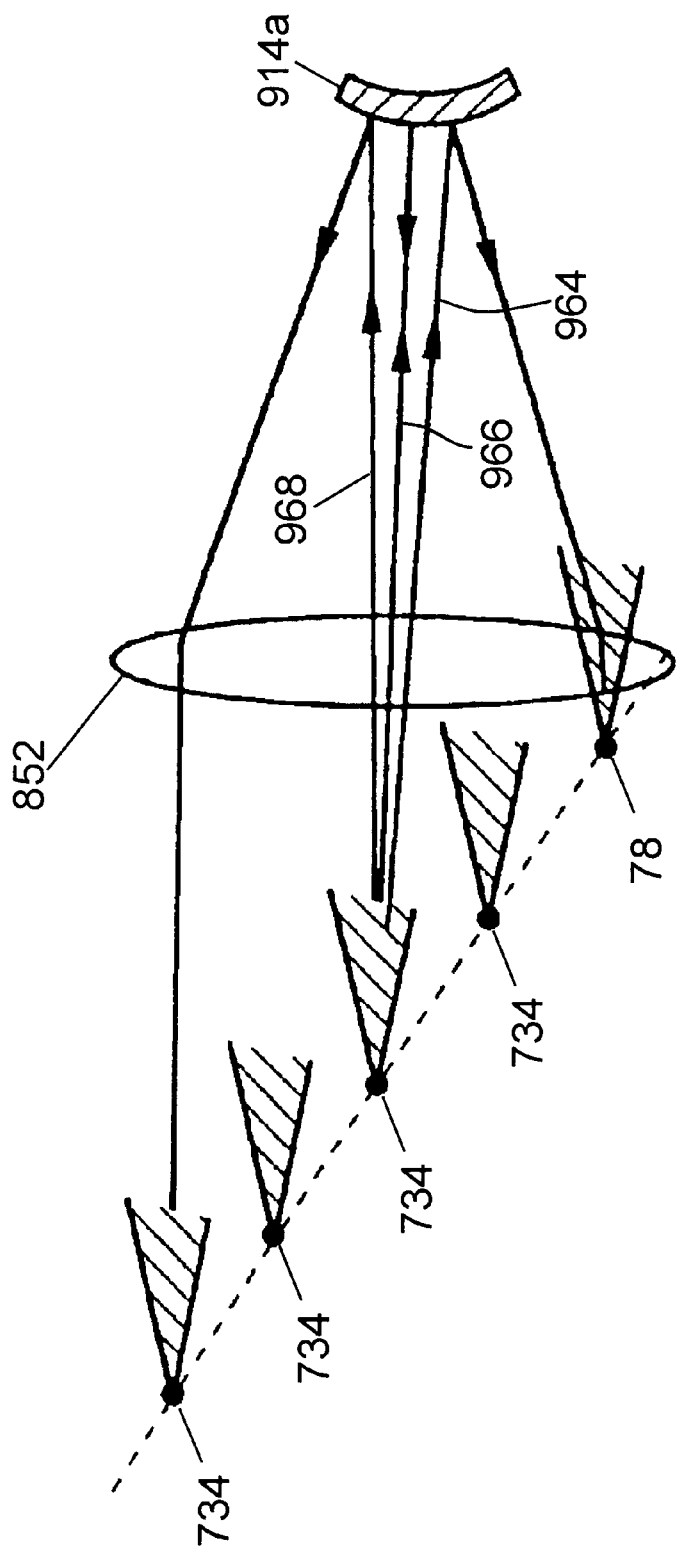
FIGS. 14a and 14b are diagrams illustrating side views of a prior-art apparatus which uses a VIPA together with a curved light reflecting apparatus.
Figure 14B:
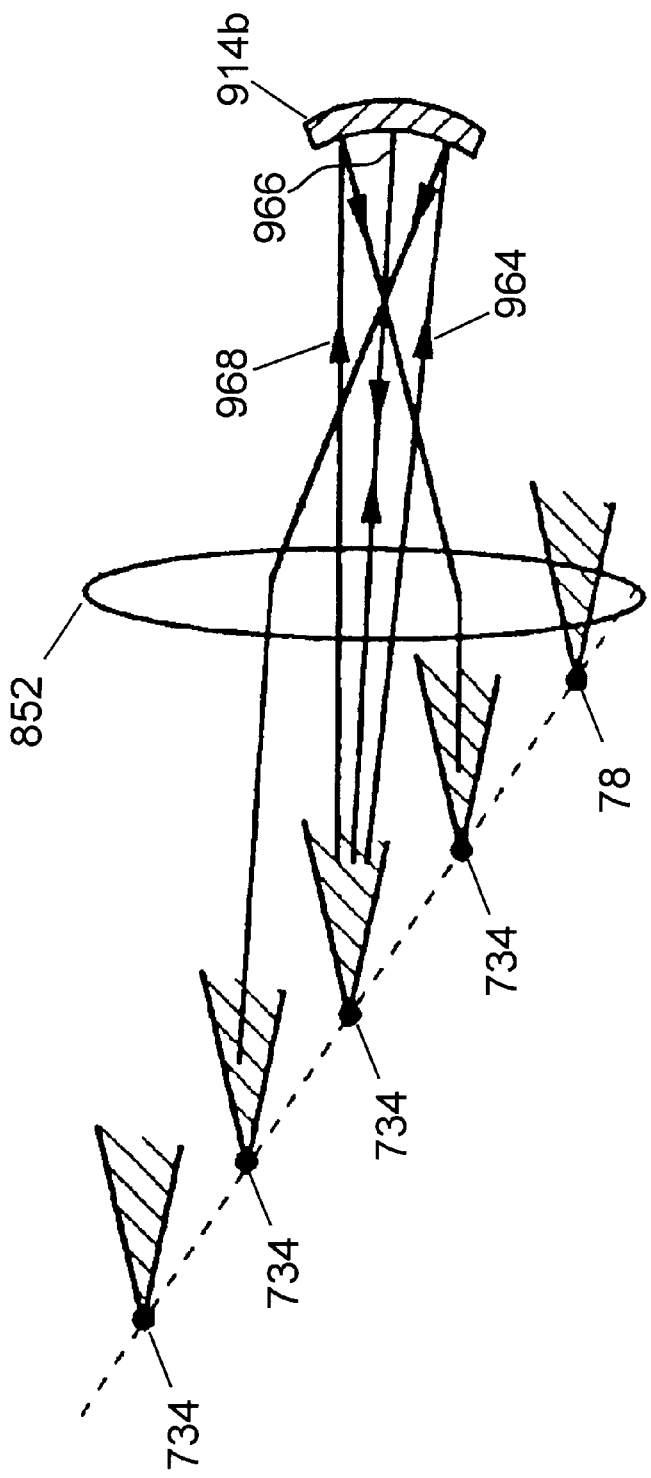

FIGS. 14*a* and 14*b* are diagrams illustrating additional embodiments of prior-art apparatuses which use a VIPA to provide various values of chromatic dispersion to light. In FIGS. 14*a* and 14*b*, there are illustrated the travel directions of a longer wavelength 964, a center wavelength 966 and a shorter wavelength 968 of light emitted by a virtual image 734 of beam waist 78. In FIGS. 14*a* and 14*b*, the mirror 914*a* and the mirror 914*b* are located at or near the focal point of focusing lens 852. In FIG. 14*a*, mirror 914*a* is a convex mirror. With a convex mirror, the beam shift is magnified relative to that produced by a flat mirror. Therefore, a large chromatic dispersion can be obtained with a short lens focal length and a small amount of space. In FIG. 14*b*, mirror 914*b* is a concave mirror. With a concave mirror, the sign of the dispersion is inverted relative to that produced by a flat mirror.

With either a flat mirror 854 (FIG. 13) or a convex mirror 914*a* (FIG. 14*a*), the light of longer ("red") wavelengths of an optical signal travels a shorter round trip distance through the apparatus then does the light of shorter ("blue") wavelengths of said signal. Thus, negative chromatic dispersion is introduced into the signal. This form of apparatus is useful for compensating accumulated positive chromatic dispersion in an optical signal. With a concave mirror 914*b* (FIG. 14*b*), the light of "red" wavelengths of an optical signal travels a greater distance through the apparatus then does the light of "blue" wavelengths of said signal and, thus, positive chromatic dispersion is introduced into the signal. This latter form of apparatus is useful for compensating accumulated negative chromatic dispersion in an optical signal.

Figure 15:
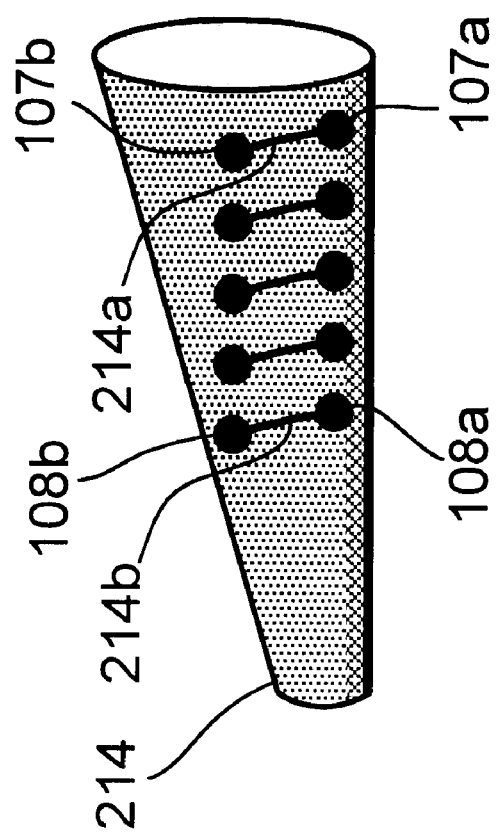
FIG. 15 is a perspective view showing the locations of the focused wavelengths of the various channels upon the conical mirror of the equalizer/compensator in accordance with the present invention.

The discussion of the operation of the equalizer/compensator 200 is now continued with reference to FIGS. 9*a*–9*b* and FIG. 15. FIG. 15 is a perspective view showing the location of the focused wavelengths of the various channels upon the conical mirror of the equalizer/compensator in accordance with the present invention. The mirror 214 comprises a complex three-dimensional shape that generally reflects the various wavelengths comprising each individual channel along trajectories comprising different vertical components and reflects the various channels along trajectories comprising different horizontal components. The general dispositions of the wavelengths of the various channels of the composite optical signal 101, as focused onto the mirror 214 by the lens 112 of the equalizer/compensator 200, are illustrated in FIG. 15. In the preferred embodiment (FIG. 15), the mirror 214 has a conical shape with its axis disposed perpendicular to the long axis of compensator 200. However, the mirror 214 may comprise any suitable shape.

Upon reflection from the mirror 214, the relatively longer wavelength 107*a* of the first channel 107 is separated from the relatively shorter wavelength 107*b* of the first channel 107 in the vertical dimension (parallel to the z-axis) by virtue of the spatial dispersion of wavelengths by the VIPA 76. Likewise, the relatively longer wavelength 108*a* of the second channel 108 is separated from the relatively shorter wavelength 108*b* of the second channel 108 in the vertical dimension. The remainder of the intermediate wavelengths comprising the first channel 107 and the second channel 108 lie along the curves 214*a*–214*b* joining the focal points of wavelengths 107*a* and 107*b* and joining the focal points of wavelengths 108*a* and 108*b*, respectively, upon the surface of the mirror 214. Curve 214*a* (comprising the first channel 107) is separated from curve 214*b* (comprising the second channel 108) along a horizontal direction (i.e., within a plane parallel to the x-y plane) by virtue of the spatial dispersion of wavelengths by the transmission diffraction grating 110. Similarly, the wavelength comprising a plurality of additional channels comprising composite optical signal 101 are focused along essentially parallel curves disposed to one side of and/or the other side of or between the focal positions of the first 107 and second channel 108.

The reflected portions of the channels within equalizer/compensator 200 are illustrated in FIG. 9*b*. The longer wavelength channel 107 comprises the wavelength components 107*a*–107*b* in addition to a continuous plurality of intermediate wavelengths between the wavelength components 107*a*–107*b*. The shorter wavelength channel 108 comprises the wavelength components 108*a*–108*b* in addition to a continuous plurality of intermediate wavelengths between the wavelength components 108*a*–108*b*. The returning reflected longer-wavelength channel 107, shown by dashed lines in FIG. 9*b*, assumes a return pathway that is coincident with or nearly coincident with that of the same channel prior to reflection from mirror 214. However, the returning reflected shorter-wavelength channel 108, shown by dotted lines in FIG. 9*b*, assumes a different trajectory that is offset along the y-direction from that of the same channel prior to reflection. This offset occurs as a result of the different trajectories of reflection from mirror 214 induced by the angular dispersion of the transmission diffraction grating 110. The mechanism of this offset is similar, for instance, to the offset between channels 108 and 108*r* within the gain slope equalizer 100 (FIG. 2*c*) and persists throughout the remainder of the return pathways of the channels.

The returning, reflected channels 107–108 pass back, in sequence, through the lens 112 and the transmission diffraction grating 110. After passing through the transmission diffraction grating 110 in the return direction, the light rays comprising the two channels 107–108 are parallel to one another but offset from one another along the y-direction. These channel then enter the VIPA 76 and re-emerge from the VIPA 76 through the beam waist 78. The VIPA 76 provides compensatory chromatic dispersion to each of the channels 107–108, and others, by the mechanisms discussed in reference to FIGS. 10–14*b* herein. Further, as a result of the possibly differing curvature of the mirror 214 along the curves 214*a* and 214*b*, the channels 107–108 may receive different degrees of chromatic dispersion, thereby also compensating for chromatic dispersion slope of the original composite optical signal 101.

After exiting the VIPA 76, the chromatic-dispersion-compensated light comprising the channels 107–108, and possibly other channels, is collimated by the cylindrical lens 104 and focused by the lens 103 onto the end face of fiber 102, from which it exits the equalizer/compensator 200. In the example shown in the top drawing of FIG. 9*b*, the offset parallel to the y-axis between the collimated light of the returning channel 108 and the counter-propagating light of composite optical signal 101 leads to attenuation of the returning channel 108. The mechanism of this attenuation is the same as that previously described, for instance, in reference to the gain slope equalizer 100 (FIGS., 2*a*–2*c*).

By the mechanisms described above, the equalizer/compensator 200 simultaneously performs the functions of gain-slope equalization, chromatic dispersion compensation, and chromatic dispersion slope compensation. The degree of gain slope equalization and chromatic dispersion and dispersion slope compensation may be adjusted through controlled adjustments of the position and orientation of the mirror 214. For instance, if the curvature of the mirror 214 is not constant amongst various cross sections taken normal to the long axis of the mirror 214, then the degree of chromatic dispersion compensation, and possibly dispersion slope compensation produced by the apparatus 200 may be adjusted by translation of the mirror 214 along adjustment direction 132 (FIG. 9a), essentially parallel to its long axis. This translation brings differently curved portions of the mirror into the pathways of the channels 107–108 and thus varies the degree of chromatic dispersion and/or dispersion slope through the mechanisms illustrated in FIGS. 14a–14b. Further, rotational adjustments of mirror 214 according to adjustment direction 131 cause variations of the return directories of the channels 107–108 within the x-y plane and thereby cause variation of the degree of attenuation of these channels, as previously described for the other embodiments of the gain-slope equalizers in accordance with the present invention.

Figure 16A:
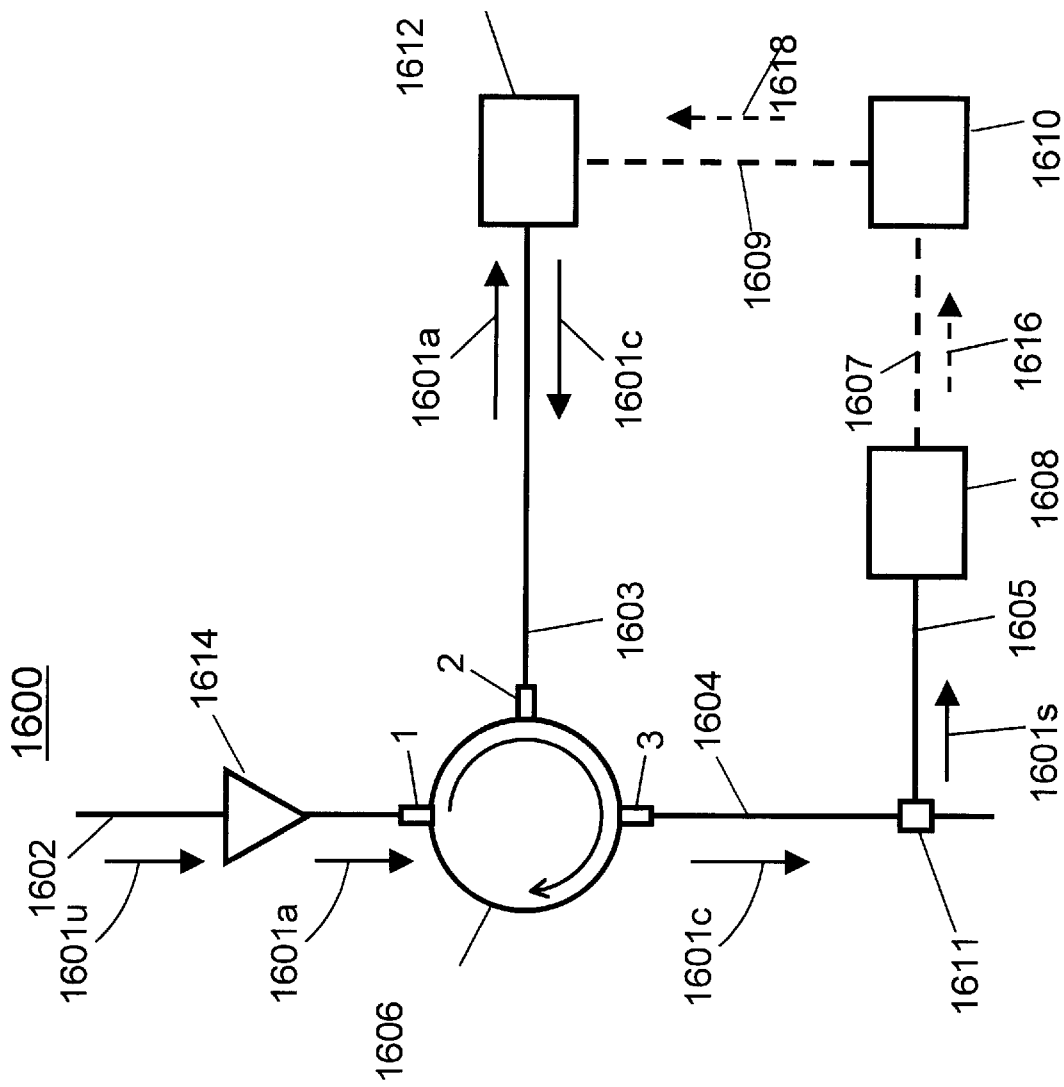
FIGS. 16a–16b illustrate a first and a second preferred embodiments of a system for control of optical gain slope within a composite optical signal in accordance with the present invention.
Figure 16B:
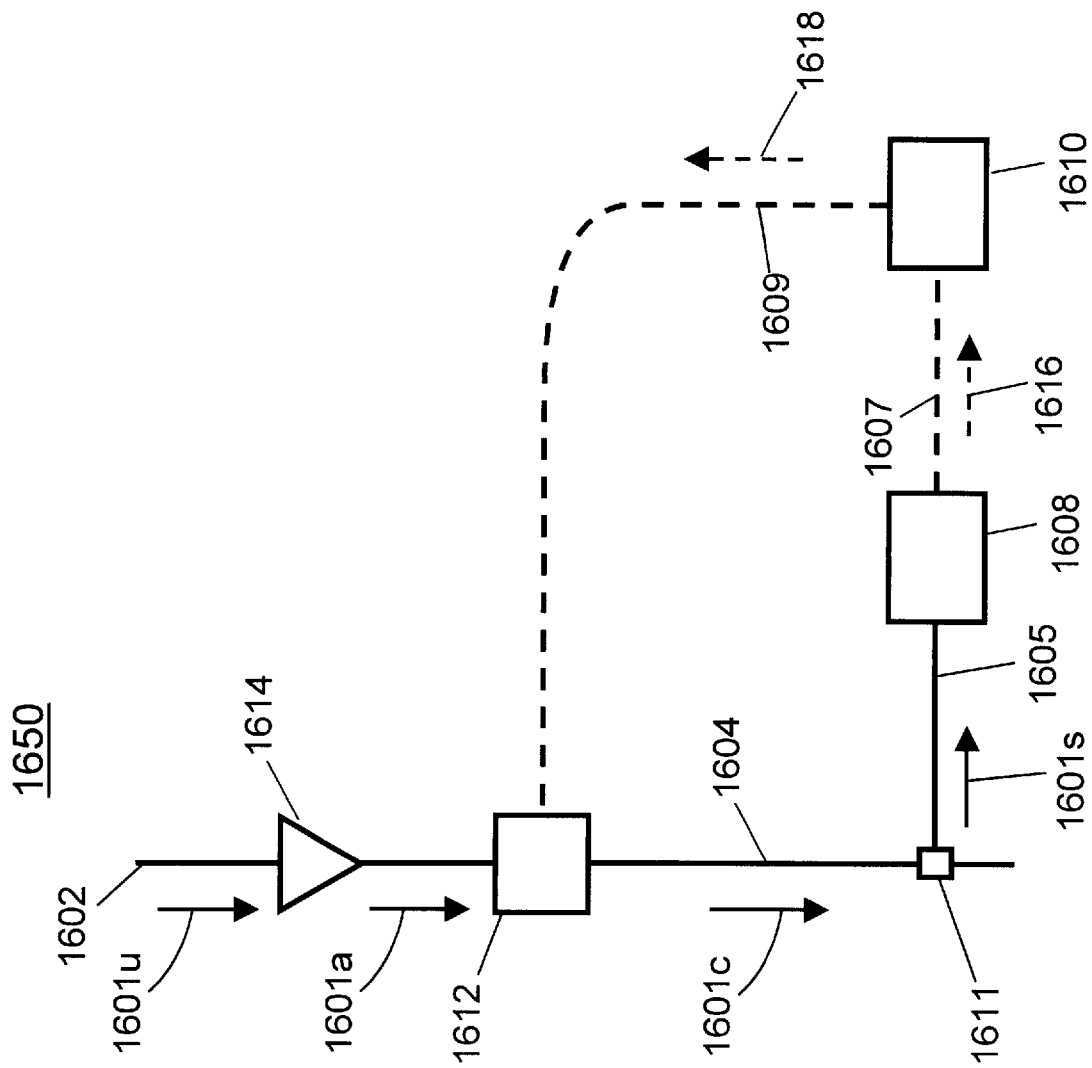

FIGS. 16a–16b illustrate a first and a second preferred embodiment of a system for control of optical gain tilt within a composite optical signal in accordance with the present invention. Either of the systems 1600 and 1650 (FIGS. 16a–16b) may be also utilized to control chromatic dispersion and chromatic dispersion slope in the signal. The system 1600 (FIG. 16a) is suitable for use in conjunction with a gain slope equalizer, such as one of the equalizers 100 (FIGS. 2a–2c), 140 (FIGS. 3a–3b), 180 (FIG. 7) or 200 (FIGS. 9a–9b) that comprises a single fiber for input of an amplified signal 1601a and output of an amplified, equalized and compensated signal 1601c. The system 1650 (FIG. 16b) is suitable for use in conjunction with a gain slope equalizer, such as one of the equalizers 150 (FIGS. 4a–4b), 160 (FIG. 5) or 170 (FIGS. 6a–6b) that comprises one fiber each for input and for output.

The system 1600 (FIG. 16a) comprises an input fiber optic line 1602, an optical tap 1611, an optical analyzer 1608, a gain slope equalizer controller 1610, a gain slope equalizer 1612, an optical circulator 1606, an EDFA 1614 and an output fiber optic line 1604. The input line 1602 and output line 1604 are optically coupled to port 1 and to port 3 of circulator 1606, respectively and the EDFA 1614 is disposed within the input line 1602. The system 1600 further comprises a fiber optic tap line 1605 optically coupling the optical tap 1611 to the optical analyzer 1608 and a fiber optic line 1603 optically coupling the gain slope equalizer 1612 to port 2 of the circulator 1606. The system 1600 further comprises first 1607 and second 1609 electronic signal or control lines respectively connected between the optical analyzer 1608 and the controller 1610 and between the controller 1610 and the gain slope equalizer 1612. The gain slope equalizer 1612, may also perform the functions of chromatic dispersion and chromatic dispersion slope compensation as described in reference to the equalizer/compensator 200 (FIGS. 9a–9b).

Referring now to FIG. 16a, an un-amplified composite optical signal 1601u is input to the system 1600 via the input fiber optic line 1602. The un-amplified signal 1601u is amplified by EDFA 1614 so as to produce the amplified signal 1601a. The amplified signal 1601a comprises non-uniform intensities of the various channels, as a result of non-uniform optical gain of EDFA 1614. The amplified signal 1601a may also comprise unwanted chromatic dispersion acquired during long-distance transmission through the input line 1602. The amplified composite optical signal 1601a passes from the EDFA 1614 to port 1 of the optical circulator 1606. The optical circulator directs signal 1601a to port 2, from which it is immediately output to the fiber optic line 1603 and input to the gain slope equalizer or equalizer/compensator 1612. Preferably, the gain slope equalizer 1612 comprises one of the embodiments of the present invention, such as, for instance, the gain slope equalizer 100 (FIGS. 2a–2b) or the equalizer/compensator 200 (FIG. 7).

As described previously herein, the gain slope equalizer 1612 compensates for the non-uniform intensities among the channels of the amplified signal 1601a and may also provide compensatory chromatic dispersion and/or chromatic dispersion slope to the channels of this signal 1602a. The resulting compensated composite optical signal 1601c output from the gain slope equalizer 1612 is output along the optical fiber line 1603 in the opposite direction from the input signal 1601a. The compensated signal 1601c is then input to optical circulator 1606 through port 2. By the well-known operation of optical circulators, the compensated signal 1601c is directed to port 3 of optical circulator 1606, from which it is immediately output to the output fiber optic line 1604. A small portion 1601s of the compensated output signal 1601c is split off from signal 1601c by the optical tap 1611 and diverted to the optical analyzer 1608 via the fiber optic tap line 1605.

The gain slope equalizer 1612 is controlled by electronic signal 1618 output from controller 1610 along electronic line 1609. The controller 1610 generates control signals in response to an electronic signal or signals 1616 produced by optical analyzer 1608 and sent to the controller 1610 along electronic line 1607. The electronic signal(s) 1616 contains information measured by the optical analyzer 1608 and pertaining to the intensities of the channels and, possibly, the magnitude and sign of chromatic dispersion and chromatic dispersion slope comprising the sample signal 1601s. These quantities also relate to the signal 1601c. In response to these measurements, the optical analyzer 1608 outputs the electronic signal 1616 to controller 1610 along electronic line 1607.

The amount of compensatory variable optical attenuation and/or chromatic dispersion provided by gain slope equalizer 1612 is controlled by the electronic signal 1618 output from the controller 1610 in response to the signal characteristics measured by optical analyzer 1608. If the gain slope equalizer 1612 comprises one of the embodiments in accordance with the present invention, adjusting one or more of the various optical components along its respective adjustment direction, as described previously herein, causes variation in the magnitude and sign of the compensatory dispersion. The adjustment continues until the degree of channel intensity uniformity and chromatic dispersion comprising sample signal 1601s, as determined by the optical analyzer 1608, are within pre-determined limits.

The system 1650 (FIG. 16b) is similar to the system 1600 (FIG. 16a) except that the gain slope equalizer 1612 is directly coupled to the input line 1602 and to the output line 1604 and the optical circulator and the fiber optic line coupled to the Port 2 of the circulator are omitted. Since, in the system 1650, the gain slope equalizer 1612 comprises separate input and output fibers, there is no need for the separation function provided by an optical circulator and, consequently, no need for a separate optical fiber connecting the gain slope equalizer 1612 to a circulator. Other components and aspects of the operation of the system 1650 (FIG. 16b) are similar to those of the system 1600 (FIG. 16a).

An improved gain slope equalizer which provides variable optical attenuation has been disclosed. The gain slope equalizer includes a transmission diffraction grating with a first side and a second side; a first lens optically coupled to the second side of the transmission diffraction grating; and at least one reflective surface optically coupled to the first lens at a side opposite to the transmission diffraction grating. The gain slope equalizer in accordance with the present invention can also be used with a Virtually Imaged Phased Array (VIPA) to provide a chromatic dispersion slope compensation as well as variable optical attenuation. The present invention provides the heretofore unavailable capability of simultaneous tunable compensation of these various optical signal properties utilizing a single apparatus.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A gain slope equalizer, comprising:
   a transmission diffraction grating with a first side and a second side;
   a first lens optically coupled to the second side of the transmission diffraction grating, wherein a position of the first lens is adjustable; and
   at least one reflective surface optically coupled to the first lens at a side opposite to the transmission diffraction grating.

2. A gain slope equalizer, comprising:
   a transmission diffraction grating with a first side and a second side;
   a first lens optically coupled to the second side of the transmission diffraction grating; and
   at least one reflective surface optically coupled to the first lens at a side opposite to the transmission diffraction grating, wherein a rotation of the at least one reflective surface is adjustable.

3. A gain slope equalizer, comprising:
   a transmission diffraction grating with a first side and a second side;
   a first lens optically coupled to the second side of the transmission diffraction grating; and
   at least one reflective surface optically coupled to the first lens at a side opposite to the transmission diffraction grating, wherein the at least one reflective surface comprises a mirror.

4. A gain slope equalizer, comprising:
   a transmission diffraction grating with a first side and a second side;
   a first lens optically coupled to the second side of the transmission diffraction grating, wherein the first lens comprises a focusing lens; and
   at least one reflective surface optically coupled to the first lens at a side opposite to the transmission diffraction grating.

5. A gain slope equalizer, comprising:
   a transmission diffraction grating with a first side and a second side;
   a first lens optically coupled to the second side of the transmission diffraction grating, wherein the first lens comprises a cylindrical lens; and
   at least one reflective surface optically coupled to the first lens at a side opposite to the transmission diffraction grating.

6. A gain slope equalizer, comprising:
   a transmission diffraction grating with a first side and a second side;
   a first lens optically coupled to the second side of the transmission diffraction grating;
   at least one reflective surface optically coupled to the first lens at a side opposite to the transmission diffraction grating; and
   a second lens optically coupled to the first side of the transmission diffraction grating.

7. The equalizer of claim 6, wherein the second lens comprises a collimating lens.

8. A gain slope equalizer, comprising:
   a first lens;
   a Virtually Imaged Phased Array (VIPA) optically coupled to the first lens;
   a transmission diffraction grating optically coupled to the VIPA at a side opposite to the first lens;
   a second lens optically coupled to the transmission diffraction grating at a side opposite to the VIPA; and
   a reflective surface optically coupled to the second lens at a side opposite to the transmission diffraction grating, wherein a position or orientation of the reflective surface is adjustable.

9. The equalizer of claim 8, wherein the first lens comprises:
   a cylindrical lens optically coupled to the VIPA at a side opposite to the transmission diffraction grating; and
   a collimating lens optically coupled to the cylindrical lens at a side opposite to the VIPA.

10. The equalizer of claim 8, wherein the reflective surface comprises a mirror having a shape wherein each channel, output by the VIPA and the transmission diffraction gratings intercepts the mirror at a different position.

* * * * *